(12) United States Patent
Hudson et al.

(10) Patent No.: US 7,773,942 B2
(45) Date of Patent: Aug. 10, 2010

(54) REDUNDANT COMMUNICATION PATH FOR SATELLITE COMMUNICATION DATA

(75) Inventors: Erwin C. Hudson, Centennial, CO (US); Remberto L. Martin, Centennial, CO (US)

(73) Assignee: Wildblue Communications, Inc., Greenwood Village, CO (US)

( * ) Notice: Subject to any disclaimer, the term of this patent is extended or adjusted under 35 U.S.C. 154(b) by 490 days.

(21) Appl. No.: 11/847,102

(22) Filed: Aug. 29, 2007

(65) Prior Publication Data

US 2008/0055152 A1   Mar. 6, 2008

Related U.S. Application Data

(60) Provisional application No. 60/840,809, filed on Aug. 29, 2006.

(51) Int. Cl.
*H04B 7/185* (2006.01)
(52) U.S. Cl. ............... 455/12.1; 455/3.02; 455/428; 455/430; 342/352
(58) Field of Classification Search ........... 455/12.1, 455/3.01, 3.02, 9, 427, 428, 430; 342/352, 342/357
See application file for complete search history.

(56) References Cited

U.S. PATENT DOCUMENTS

| | | | | |
|---|---|---|---|---|
| 4,858,229 | A | 8/1989 | Rosen et al. | 370/325 |
| 5,465,410 | A | 11/1995 | Hiben et al. | 455/266 |
| 5,839,050 | A | 11/1998 | Baehr et al. | 455/2.01 |
| 5,991,622 | A | 11/1999 | Henry, Jr. | 455/434 |
| 6,047,171 | A | 4/2000 | Khayrallah et al. | 455/266 |
| 6,169,513 | B1 | 1/2001 | Cohen | 342/354 |
| 6,763,006 | B1* | 7/2004 | Lockett | 370/318 |
| 7,289,062 | B2 | 10/2007 | Hudson et al. | 342/359 |
| 2004/0224633 | A1 | 11/2004 | Coromina et al. | 455/13.3 |
| 2007/0037512 | A1 | 2/2007 | Godwin | 455/3.02 |

FOREIGN PATENT DOCUMENTS

| | | |
|---|---|---|
| WO | WO 99/18678 | 4/1999 |
| WO | WO 2004/002016 A2 | 12/2003 |
| WO | WO 2004/002016 A3 | 12/2003 |
| WO | WO 2005/067367 | 7/2005 |
| WO | WO 2005/067367 A2 | 7/2005 |

(Continued)

OTHER PUBLICATIONS

Hudson, et al., "Network-Access Satellite Communication System," U.S. Appl. No. 11/847,064, filed Aug. 29, 2007.

(Continued)

*Primary Examiner*—Matthew D Anderson
*Assistant Examiner*—Shaima Q Aminzay
(74) *Attorney, Agent, or Firm*—William W. Cochran; Cochran Freund & Young LLC

(57) ABSTRACT

According to one embodiment, a method for use in managing satellite communications includes: receiving, at a first earth-based gateway antenna system, one or more microwave communication signals from a substantially geostationary satellite; monitoring for a performance change in at least one signal from the satellite; and, in response to detecting a performance change in the at least one signal, transmitting instructions to the satellite to transmit at least a portion of the one or more microwave communication signals to a second earth-based gateway antenna system.

10 Claims, 14 Drawing Sheets

FOREIGN PATENT DOCUMENTS

WO    WO 2005/067367 A3    7/2005

OTHER PUBLICATIONS

Hudson, et al., "Network-Access Satellite Communication System," U.S. Appl. No. 11/847,006, filed Aug. 29, 2007.
Hudson, et al., "Network-Access Satellite Communication System," U.S. Appl. No. 11/847,084, filed Aug. 29, 2007.
Hudson, et al., "Network-Access Satellite Communication System," U.S. Appl. No. 11/847,121, filed Aug. 29, 2007.
Patent Cooperation Treaty; Invitation to Pay Additional Fees, International application No. PCT/US2007/077124; Applicant WildBlue Communications; 7 pages, Mar. 11, 2008.
PCT Notification of Transmittal of the International Search Report and The Written Opinion of the International Searching Authority, or the Declaration; Internation Application No.: PCT US2007/077124; 22 pages, Jul. 22, 2008.

\* cited by examiner

REDUNDANT COMMUNICATION PATH FOR SATELLITE COMMUNICATION DATA

RELATED APPLICATIONS

This application claims the benefit under 35 U.S.C. §119(e) of U.S. Provisional Application Ser. No. 60/840,809 filed Aug. 29, 2006.

TECHNICAL FIELD

This invention relates generally to communication systems, and more particularly to a network-access satellite communication system.

BACKGROUND

Commercial satellites have historically been optimized for broadcast applications, where data are transmitted from a broadcast center on the earth up to a satellite in space, and the satellite retransmits these signals down to a population of receive-only earth stations or satellite terminals on the earth. Traditional broadcast satellites are characterized by two features. First, traditional broadcast satellites provide "one-way" communications, such that the recipient of the data (i.e. the end-user) is equipped with a receive-only terminal that has no ability to transmit a signal back up to the satellite. Second, traditional broadcast satellites are designed for wide geographic coverage using antennas or combinations of antennas on the satellite with beams that cover large regional, national, or continental areas.

A typical business goal for traditional broadcast satellite operators is to provide as much data as possible (e.g., hundreds of television channels) to a large number of end-users or customers. For content of national or international interest (e.g., televised sports, movies and news), a satellite operator may choose to broadcast the same data to an entire country or even to an entire continent. A video broadcast satellite, with a single antenna beam covering the continental U.S. and providing hundreds of television channels to U.S. customers, is a good example of a traditional broadcast satellite. For regional content, some broadcast satellites have several antenna beams that effectively divide the earth terminal population into large regional groups such that certain combinations of the broadcast data content are transmitted to each group. In both cases, the broadcast satellite system provides one-way communications to customers over a large geographic area.

Using a traditional broadcast satellite with antenna beams covering entire national or large regional areas to private communications with a single terminal somewhere in the coverage area is not an efficient approach for network-access satellite services. For example, if a customer with a two-way earth terminal located in New York wants to establish a private two-way connection to the Internet, transmitting energy from a satellite over the entire continental U.S. to send information to a single customer in New York would be an inefficient use of limited and costly satellite resources.

In recent years, satellite operators have used satellites to provide network-access services (e.g., telephony, private networks, and Internet access) to a large population of end-users or customers. In modern network-access satellite communications systems, end-users are equipped with earth terminals that both receive signals from a satellite and also transmit signals back up to a satellite. Modern network-access satellite systems are architecturally different from traditional one-way broadcast satellite systems in that each earth terminal is, in effect, carrying on a two-way private conversation with the satellite network and generally has no interest in "hearing" signals being transmitted to and from any other earth terminals on the network.

A satellite with a more highly focused antenna beam limited in area to an individual customer's immediate local area s a much more efficient way for transmitting data to this particular customer than a traditional broadcast satellite. Similarly, in the earth-to-space direction, if a receiver on a satellite is focused in on a much narrower geographical region that covers just the customer's immediate area, less power is required for that customer's earth terminal to transmit information to the highly focused receiver on the satellite.

Modern network-access satellites are characterized by two features. First, modern network-access satellites provide "two-way" communications between satellites in space and terminals on the earth that have both transmit and receive capability. Second, modern network-access satellites are designed with antennas that cover the geographic area of interest on the earth with many smaller antenna beams, often tightly packed together to provide fall coverage across the area of interest without any gaps. For example, some modern network-access satellites transmit tightly packed clusters of small antenna beams that collectively cover a large geographic area, such as the continental U.S. For two-way network-access communications, by using a number of "spot-beams" over their coverage area, spot-beam satellites have significant advantages over satellites that have a single beam over the coverage area. For example, spot-beam satellites require less satellite transmitter power per customer. As another example, less transmitter power is required for earth terminals to transmit to spot-beam satellites, allowing for smaller and less expensive earth terminals. Additional advantages include the ability to reuse the same frequency bands and channels throughout the spot-beam pattern and associated coverage area, dramatically higher non-broadcast capacity per satellite to provide more compelling services to more customers, and dramatically lower satellite cost per customer. For example, the capacity of a spot-beam satellite to support a large population of end-users may be greatly enhanced by frequency reuse techniques, whereby the same frequency bands and channels are used over and over again in non-adjacent spot-beams. For example, a satellite operator may have a 500 MHz bandwidth allocation for space to earth transmissions assigned by the appropriate regulatory authority. In a single beam network architecture, this satellite operator is limited to 500 MHz of total transmission bandwidth. The transmission bandwidth may be increased by dividing this bandwidth into multiple channels, such as for example, four 125 MHz channels, and assigning one channel to each of numerous spot-beams. In this example, if the satellite utilizes 100 spot-beams, this satellite operator could utilize 12,500 MHz of total transmission bandwidth. This ability to apply frequency reuse techniques to greatly increase the capacity of a satellite network is a technical advantage of the spot-beam satellite architecture.

OVERVIEW

Particular embodiments of the present invention may reduce or eliminate problems and disadvantages associated with previous network-access satellite communications systems.

According to one embodiment, a satellite communications system includes first, second, and third microwave radiators; first and second signal splitters; and a selector. The first microwave radiator is configured to direct microwave signals to a first earth-based gateway antenna system, the microwave signals carrying communications data from a first user terminal located in a spot beam coverage region; and the first signal splitter is configured to collect at least a portion of communications data from the first user terminal. The second microwave radiator is configured to direct microwave signals to a second earth-based gateway antenna system, the microwave signals carrying communications data from a second user terminal; and the second splitter is configured to collect at least a portion of communications data from the second user terminal. The third microwave radiator is configured to direct microwave signals to a third earth-based gateway antenna system; and the first selector is configured to selectively couple the third microwave radiator to a selected one of the first and second splitters, such that the microwave signals directed by the third microwave radiator carry communications data collected from the selected one of the first and second splitters.

According to another embodiment, a satellite communications system includes first, second, and third feed horns; first and second directional couplers; and a switch. The first feed horn is configured to direct microwave signals to a first earth-based gateway antenna system, the microwave signals carrying communications data from a first user terminal located in a spot beam coverage region; and the first directional coupler is configured to collect at least a portion of communications data from the first user terminal. The second feed horn is configured to direct microwave signals to a second earth-based gateway antenna system, the microwave signals carrying communications data from a second user terminal; and the second directional coupler is configured to collect at least a portion of communications data from the second user terminal. The third feed horn is configured to direct microwave signals to a third earth-based gateway antenna system; and the first switch is configured to selectively couple the third feed horn to a selected one of the first and second directional couplers, such that the microwave signals directed by the third feed horn carry communications data collected from the selected one of the first and second directional couplers.

According to another embodiment, a method of mitigating microwave signal propagation loss for satellite communications includes: transmitting a first microwave signal from a satellite to a first earth-based gateway antenna system, using a first microwave radiator, the microwave signals carrying communications data from an earth-based user terminal; detecting propagation loss in at least one signal between the satellite and the first earth-based gateway antenna system; and transmitting a second microwave signal from the satellite to a second earth-based gateway antenna, using a second microwave radiator, the second microwave signal carrying communications data from the earth-based user terminal.

According to another embodiment, a method for use in managing satellite communications, comprising: receiving, at a first earth-based gateway antenna system, one or more microwave communication signals from a substantially geostationary satellite; monitoring for a performance change in at least one signal from the satellite; and in response to detecting a performance change in the at least one signal, transmitting instructions to the satellite to transmit at least a portion of the one or more microwave communication signals to a second earth-based gateway antenna system.

According to another embodiment, a method for use in managing satellite communication signal traffic, comprising: monitoring, at a satellite, a signal from a first earth-based gateway antenna system; and in response to detecting a performance change in the monitored signal, transmitting one or more microwave communication signals from the satellite to a second earth-based gateway antenna system.

In certain embodiments, an additional gateway may be utilized to provide one or more benefits to a satellite communications system. For example, an additional gateway may be used to provide improved performance by transferring capacity from an existing gateway to the additional gateway in periods when the existing gateway is experiencing problems due to, for example rain or weather fade. As another example, an additional gateway may be used as a backup gateway in cases of a failure at an existing gateway. Certain embodiments may provide all, some, or none of the advantages discussed above. In addition, certain embodiments may provide one or more other advantages, one or more of which may be readily apparent to those skilled in the art from the figures, descriptions, and claims included herein.

BRIEF DESCRIPTION OF THE DRAWINGS

For a more complete understanding of the present invention and certain of its advantages, reference is now made to the following description, taken in conjunction with the accompanying drawings, in which.

DESCRIPTION OF EXAMPLE EMBODIMENTS

Figure 1:
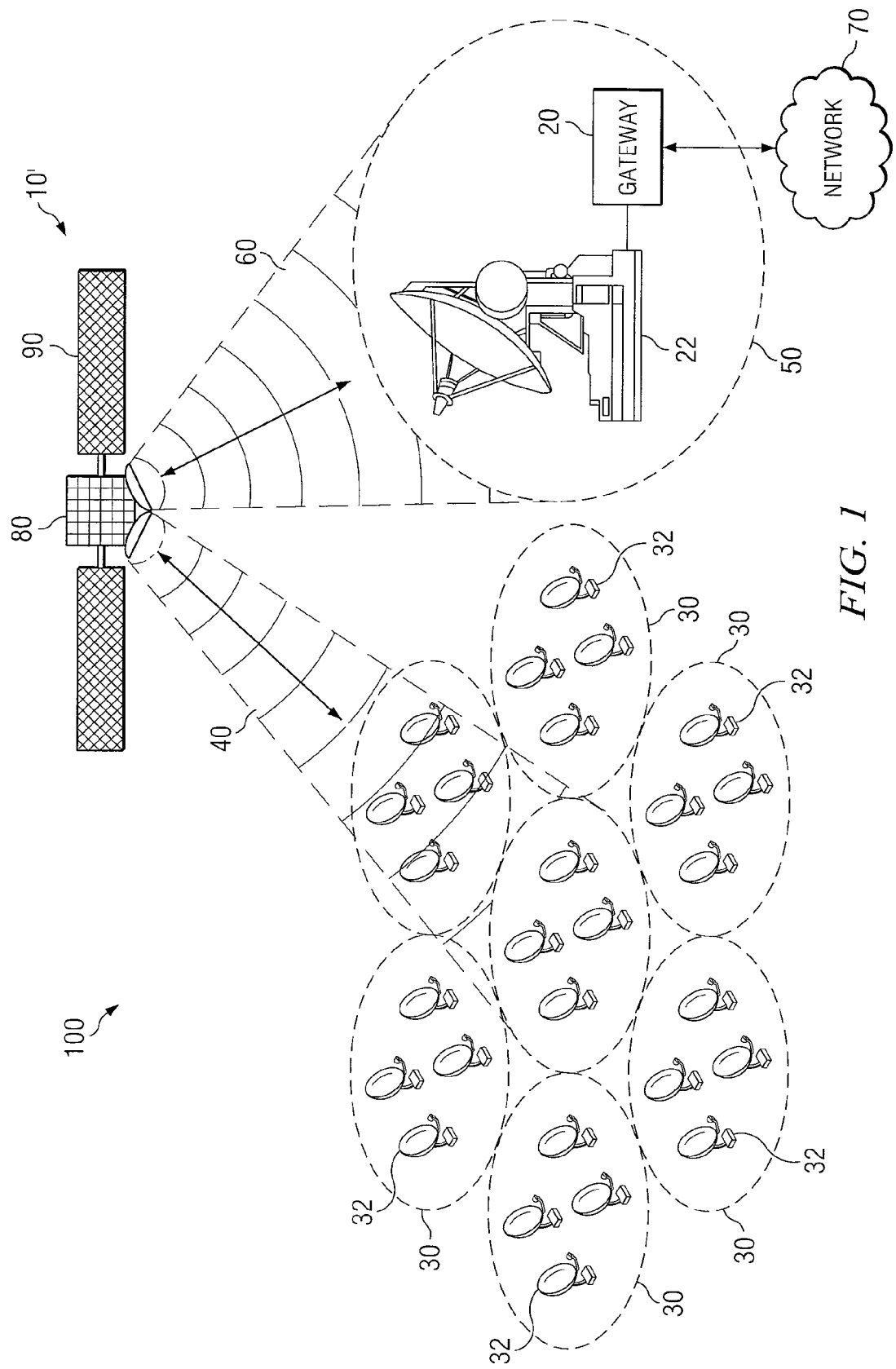
FIG. 1 illustrates an example network-access satellite communication system.

FIG. 1 illustrates an example network-access satellite communications system 100. System 100 includes satellite 10, one or more gateways 20, and one or more user terminals 32. In operation, system 100 provides for two-way communications between user terminals 32 and network 70 through satellite 10 and gateway 20. Satellite 10 includes payload 80 and one or more solar arrays 90. In certain embodiments, satellite 10 may be a geosynchronous or geostationary satellite although in alternative embodiments any appropriate orbit for satellite 10 may be used. Satellite 10 represents a spot-beam network-access satellite configured to communicate with a population of user terminals 32 distributed across a defined coverage area. Each user terminal 32 in communication with satellite 10 is positioned within at least one spot beam coverage region 30. User terminals 32 are two-way capable and may be designed with adequate transmit power and receive sensitivity to communicate reliably with satellite 10. Satellite 10 communicates with user terminals 32 by sending and receiving signals through one or more spot beams 40.

Satellite 10 communicates with gateway 20 through signals traveling in beam 60. Gateway 20 sends and receives signals to and from satellite 10 using gateway antenna system 22 located within gateway region 50. Gateway 20 is connected to one or more networks 70. Network 70 may represent a local area network (LAN), metropolitan area network (MAN), wide area network (WAN), global communications network such as the Internet, a telephony network, such as the Public Switched Telephone Network (PSTN), or any other suitable public or private network.

Figure 2:
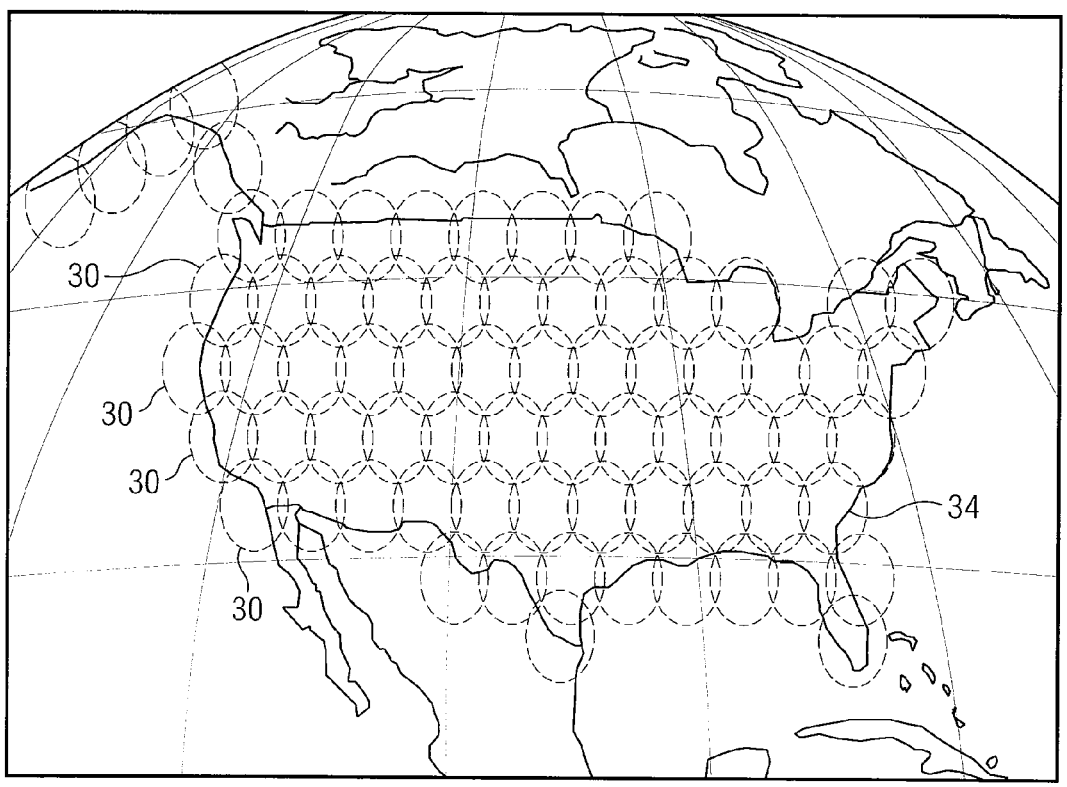
FIG. 2 illustrates example coverage regions for a spot-beam network-access satellite communications system.

FIG. 2 illustrates example spot beam coverage regions 30 for spot-beam network-access satellite communications system 100. In the embodiment shown, a pattern of spot beam coverage regions 30 is used to provide coverage for an example satellite coverage area 34. Satellite coverage area 34 may include land masses, water or ocean areas, or a combination of land masses and water areas. As shown in FIG. 2, satellite coverage area 34 represents the continental United States and portions of Alaska. Although any appropriate pattern may be used for spot beam coverage regions 30, in certain embodiments, spot beam coverage regions 30 may be distributed in a pattern that provides continuous coverage throughout satellite coverage area 34. In certain embodiments, one or more spot beam coverage regions 30 may overlap at least in part with one or more other spot beam coverage regions 30.

In certain embodiments, network access may be provided to the spot beam coverage regions 30 within satellite coverage area 34 using one or more satellites 10. In addition, each satellite 10 providing network access to satellite coverage area 34 may receive signals from one or more gateways 20. In certain embodiments, each satellite 10 may receive signals from as many as ten or more gateways 20 to provide network access to user terminals 32 within multiple spot beam coverage regions 30 in satellite coverage area 34.

Figure 3:
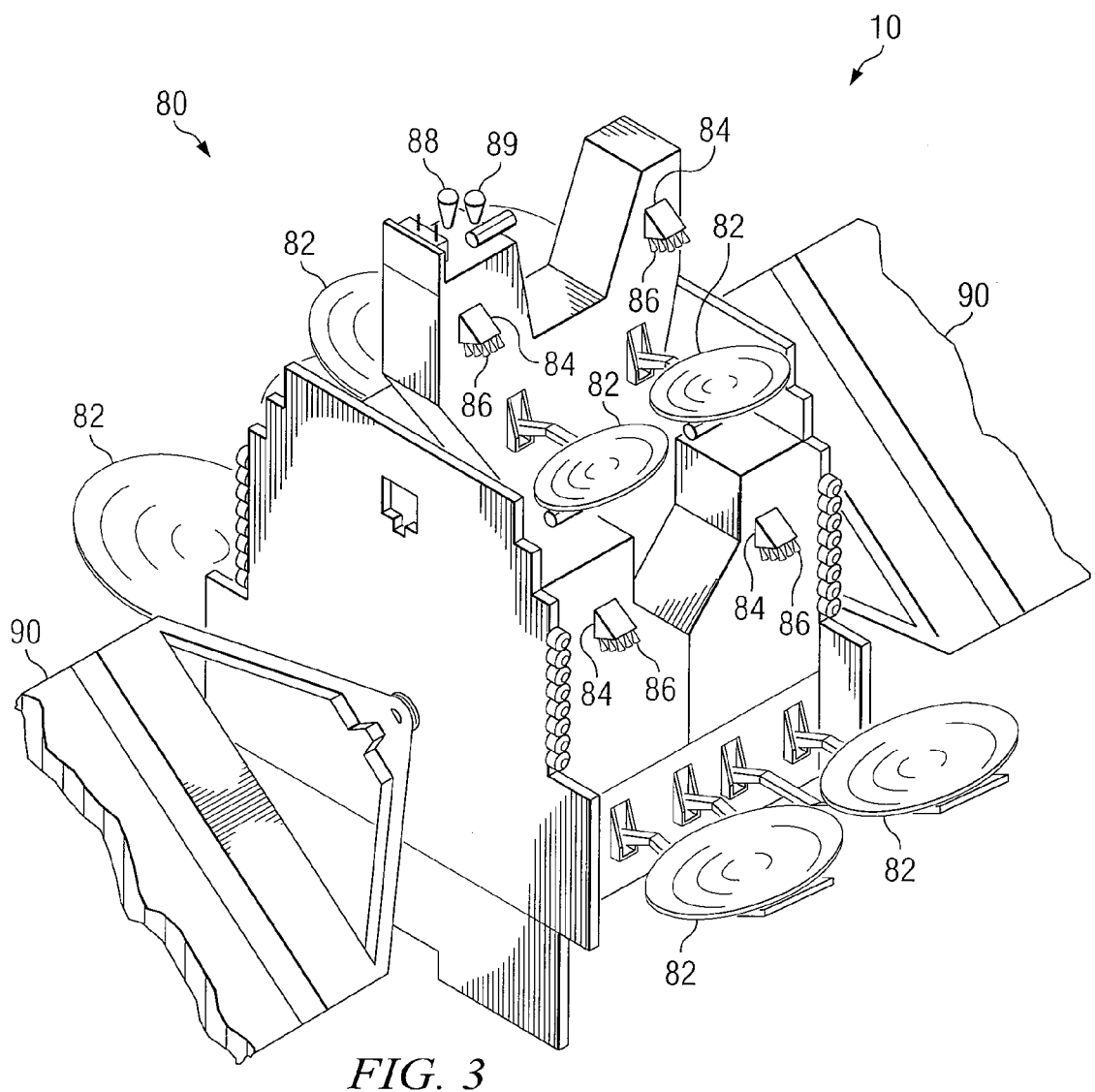
FIG. 3 illustrates an example payload for a spot-beam network-access satellite.

FIG. 3 illustrates an example payload 80 for satellite 10. Payload 80 includes antenna reflectors 82, feed horn clusters 84, telemetry command and ranging (TC&R) horn 88, and beacon horn 89. Each feed horn cluster 84 may include numerous feed horns 86. In operation, microwave signals may be transmitted by one or more feed horns 86 and then focused onto a particular region of the earth by antenna reflector 82. In certain embodiments, antenna reflector 82 may represent a Ka band transmit reflector, a Ka band receive reflector, or any appropriate reflector for directing the transmission path of microwave signals in the appropriate frequency band. In certain embodiments, particular antenna reflectors 82 and feed horn clusters 84 may be utilized to transmit signals from satellite 10, while particular antenna reflectors 82 and feed horn clusters 84 may be utilized to receive microwave signals at satellite 10. In alternative embodiments, satellite 10 may utilize one or more of two-way antennas, direct radiating antennas, array antennas, or other electromagnetic transducers.

In operation, through the use of multiple feed horns 86 within a feed horn cluster 84, a plurality of spot beams 40 may be projected into satellite coverage area 34, such that each spot beam 40 defines a particular spot beam coverage region 30. Similarly, each particular feed horn 86 within a feed horn cluster 84 may operate together with antenna reflector 82 to receive microwave signals within a particular spot beam 40 from one or more user terminals 32 within a particular spot beam coverage region 30. In certain embodiments, one or more dedicated feed horns 86 may be used to transmit microwave signals through one or more beams 60 to one or more gateways 20 within gateway region 50. In alternative embodiments, when a gateway 20 is located within a particular spot beam coverage region 30, satellite payload 80 may be configured such that a particular feed horn 86 transmits (or receives) microwave signals to (or from) one or more user terminals 32 and gateway 20. In certain embodiments, a gateway region 50 may be included within or overlap with one or more spot beam coverage regions 30. In certain embodiments, a gateway region 50 may be entirely outside satellite coverage area 34.

Although feed horns are illustrated in the drawings and identified throughout this description, in certain embodiments other suitable microwave radiators can be used together or as an alternative to feed horns. For example, and not by way of limitation, other suitable microwave radiators may include phased arrays, direct radiating apertures, slotted arrays, and helical radiators. Various embodiments may be utilized any suitable microwave radiator without departing from the scope of the invention.

The operation of system 100 can be separated into a forward (downstream) direction and a return (upstream) direction. In the downstream direction, data arrives at gateway 20 from network 70, gateway 20 transmits that data up to satellite 10, and satellite 10 relays that data down in a spot beam 40 to user terminal 32 in region 30. In the upstream direction, user terminal 32 transmits data up to satellite 10, satellite 10 relays that data down to gateway 20, and gateway 20 forwards that data to network 70.

Although the components of satellite payload 80 are described herein and illustrated in FIGS. 4-10A and 13 as analog components that may be used to guide and manipulate microwave signals, in alternative embodiments, one or more digital components may be used in addition to or as an alternative to the use of analog components. For example, satellite payload 80 may include one or more analog-to-digital converters, digital signal processors, and/or digital-to-analog converters. In various embodiments, one or more of the functions described herein may be performed with analog components, digital components, or a combination thereof without departing from the scope of the invention.

Figure 4:
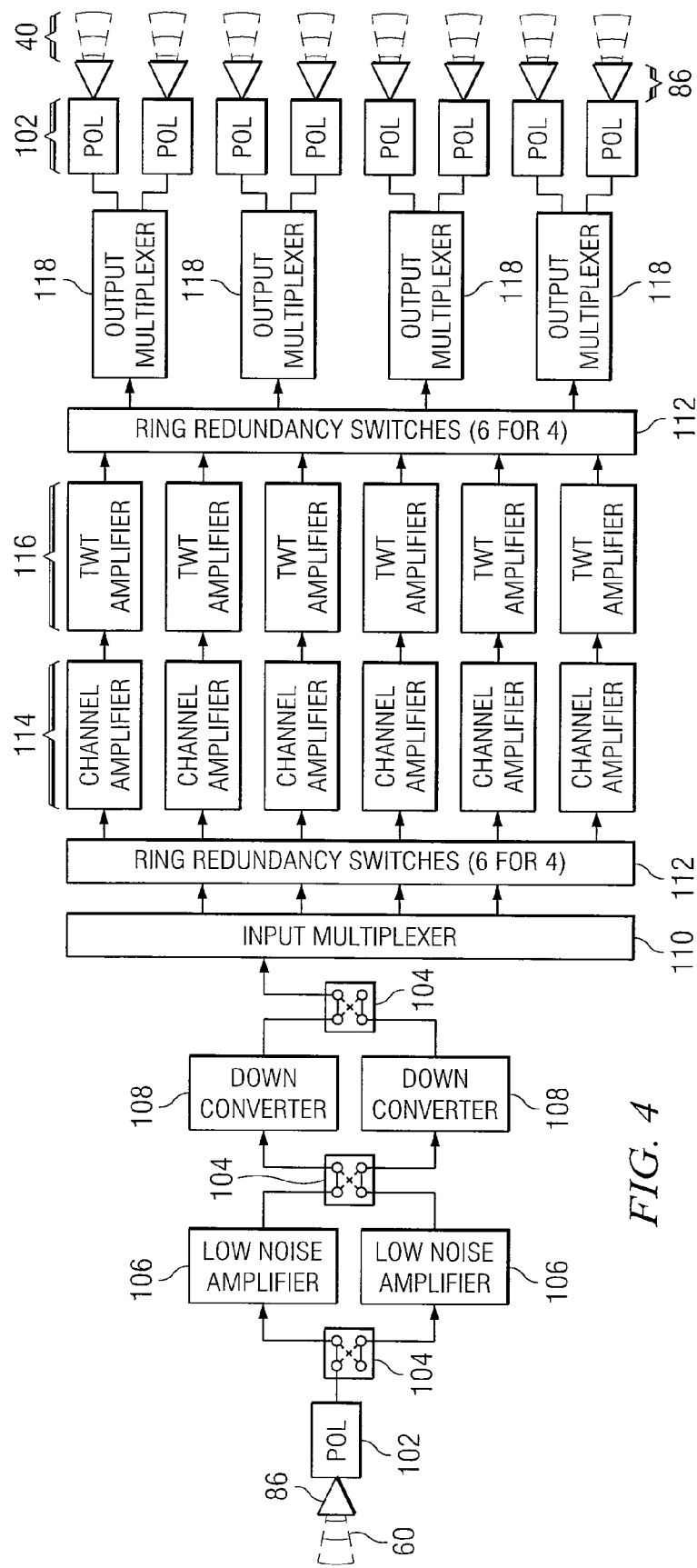
FIG. 4 illustrates an example downstream signal path through example components of a network-access satellite.

FIG. 4 illustrates an example downstream signal path through example components of satellite payload 80. For example, In the embodiment shown, a microwave signal may be received from gateway antenna system 22, split into multiple channels, amplified, and transmitted through eight different spot beams 40 to eight different spot beam coverage regions 30. Although the example components may be utilized to transmit signals through eight different spot beams 40, in alternative embodiments, more or fewer components may be utilized to provide more or fewer functions than those described below, and may be utilized to transmit signals through more or fewer spot beams 40.

Moving from left to right in FIG. 4, microwave signals are received from gateway 20 through beam 60 at feed horn 86. The signals travel through polarizer 102 and switch 104 into low noise amplifier 106. As with many of the components described herein, within satellite payload 80 many of the components may be implemented with redundancies designed to increase the longevity of satellite 10 in the event of failure of one or more components. This redundancy may be implemented through the use of multiple components distributed in parallel or in a ring configuration. Although particular configurations are shown and described herein as having specified numbers and configurations of redundant components, in alternative embodiments, any appropriate number and configuration of components may be utilized to achieve the desired level of redundancy. Accordingly, as shown in FIG. 4 there are two low noise amplifiers 106 distributed in parallel along the signal path. The signal traveling out of low noise amplifier 106 travels through another switch 104 and into down converter 108. Again, in the embodiment shown down converter 108 is doubly redundant with two down converters 108 implemented in parallel along the signal path. From down converter 108, the signal travels through a third switch 104 and into input multiplexer 110. In the embodiment shown, input multiplexer 110 is a one-to-four multiplexer with one signal input and four signal outputs. The four signal outputs shown on the right side of input multiplexer 110 represent four different channels from the input signal on the left-hand side of input multiplexer 110. In this example embodiment, these four output channels travel from input multiplexer 110 into a bank of ring redundancy switches 112. In the embodiment shown, ring redundancy switches 112 provide for six potential signal paths for these four signal channels. The signal channels traveling from ring redundancy switches 112 travel through a channel amplifier 114 and into traveling wave tube (TWT) amplifier 116 before returning to a second bank of ring redundancy switches 112. From the second bank of ring redundancy switches 112, each signal channel travels to an output multiplexer 118 which divides each of these four signal channels into two separate channels for a total of eight signal channels. Each of these eight signal channels is then polarized using polarizer 102 and transmitted using feed horn 86 through a spot beam 40 to one or more user terminals 32 within particular spot beam coverage regions 30. In various embodiments, polarizers 102 may be implemented for use with multi-band or dual-band signals utilizing linear (vertical/horizontal) polarization and/or circular (left-hand/right-hand) polarization. In alternative embodiments, more or fewer components may be utilized to provide the same, more, or fewer functions.

Figure 5:
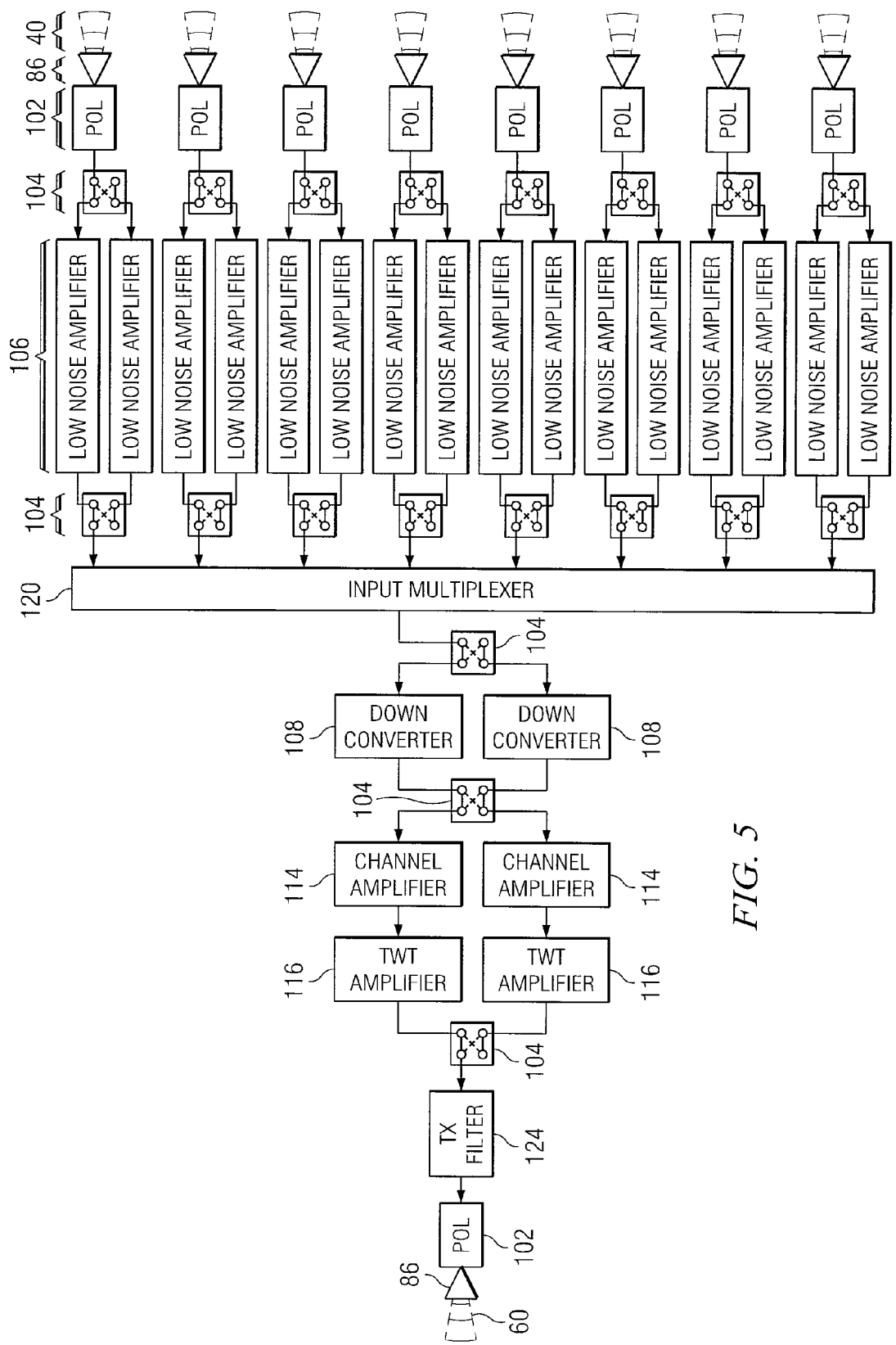
FIG. 5 illustrates an example upstream signal path through example components of a network-access satellite.

FIG. 5 illustrates an example upstream signal path through example components of satellite payload 80. In the embodiment shown, microwave signals may be received from user terminals 32 located within eight different spot beam coverage regions 30 amplified, combined into a single composite signal, and transmitted through a spot-beam 60 to gateway antenna system 22. Although the example components may be utilized to receive signals from user terminals 32 located in eight different coverage areas 30, in alternative embodiments, more or fewer components may be utilized to provide more or fewer functions than those described below, and may be utilized to receive signals from user terminals 32 located in more or fewer spot beam coverage regions 30.

Moving from right to left in FIG. 5, upstream communication signals are received from one or more user terminals 32 through spot beam 40 at feed horn 86. The communication signals then pass through polarizer 102 and switch 104 into low noise amplifier 106. As shown in FIG. 5, low noise amplifier 106 is shown as two-for-one redundant with two low noise amplifiers 106 distributed in parallel along the signal path. From low noise amplifier 106, the signal passes through switch 104 and into input multiplexer 120. In the embodiment shown, the upstream signals from eight different feed horns feed into input multiplexer 120 which combines these eight signals into a single composite signal. From input multiplexer 120, the composite signal travels through switch 104 and into down converter 122. In the embodiment shown, two for one sparing is utilized with two down converters 122 distributed in parallel along the signal path. From down converter 122, the composite signal travels through switch 104, into. As with down converter 122, in the embodiment shown, two for one sparing is utilized for channel amplifier 114 and traveling wave tube amplifier 116 with each of these components distributed in parallel. From traveling wave tube amplifier 116, the composite signal travels through switch 104 and into transmission filter 124. The composite signal is then polarized using polarizer 102 and transmitted by feed horn 86 through beam 60 to gateway 20. In alternative embodiments, more or fewer components may be utilized to provide the same, more, or fewer functions.

In the embodiments shown in FIGS. 4 and 5, communication signals traveling to and from gateway 20 utilize a separate feed horn 86 from the feed horns 86 utilized for communications to and from user terminals 32. However, in alternative embodiments, as discussed above, one or more feed horns 86 may send and/or receive communication signals to gateway 20 and one or more user terminals 32.

Figure 6A:
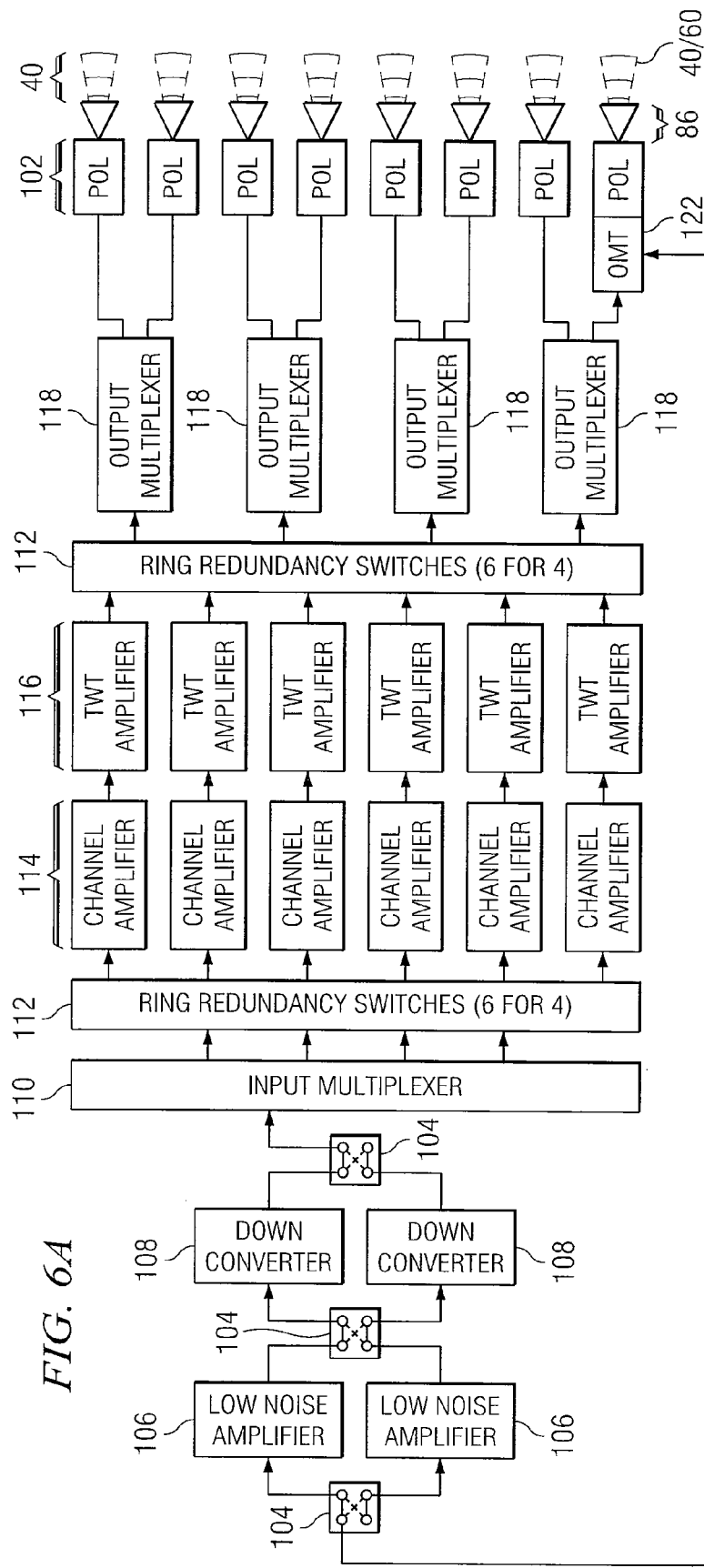
FIGS. 6A and 6B illustrate example upstream and downstream signal paths through example components of a network-access satellite.
Figure 6B:
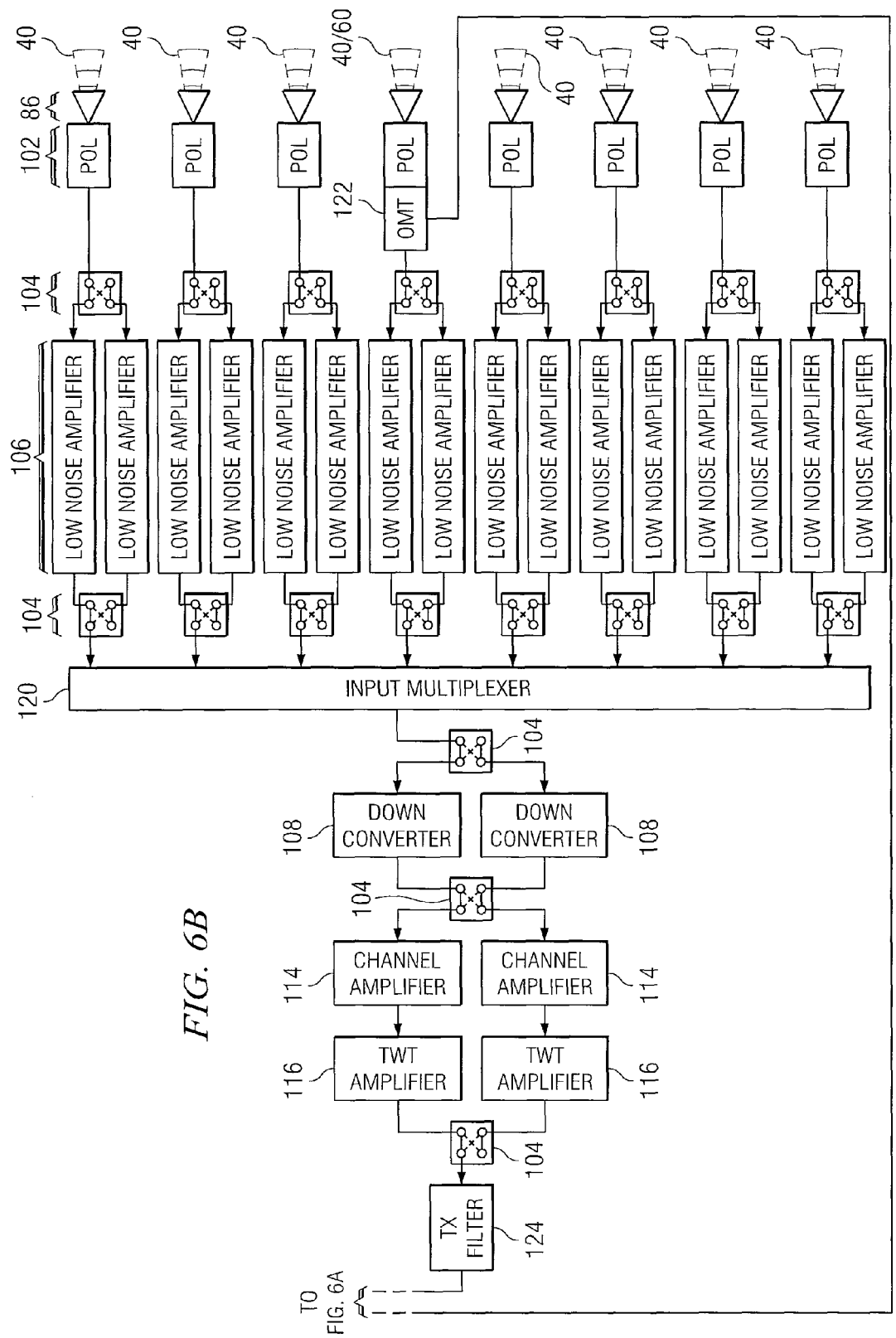

FIGS. 6A and 6B illustrate example upstream and downstream signal paths through example components of satellite payload 80, in which one or more feed horns 86 are utilized to communicate both with one or more gateway transmitters 22 and one or more user terminals 32.

Incremental Capacity

In embodiments of system 100 utilized to provide network access to a population of user terminals 32, numerous gateways 20 may be required. Each gateway 20 may be expensive to construct and may require costly manpower to maintain and operate. Following initial launch, satellite 10 may experience a light signal traffic load for a period of time until demand increases. During this period of time, while satellite 10 is operated below capacity, the number of gateways 20 required to provide sufficient coverage may be less than the entire set of gateways 20 required to support full capacity. Constructing and operating the entire set of gateways 20 during initial operations when the satellite is experiencing a light signal traffic load may be prohibitively expensive. The ability to launch a new satellite and immediately provide full geographic coverage with a smaller number of gateways 20, and then add additional gateways incrementally as required to support increasing demand, has significant economic advantages. One way to provide such incremental capacity is through a "filter-and-switch" approach. A filter-and-switch approach allows the bandwidth (or channels) from certain gateways 20 to be divided into two or more subsets, where each subset is assigned to a group of feed horns 86 using switches within payload 80 of satellite 10.

Figure 7:
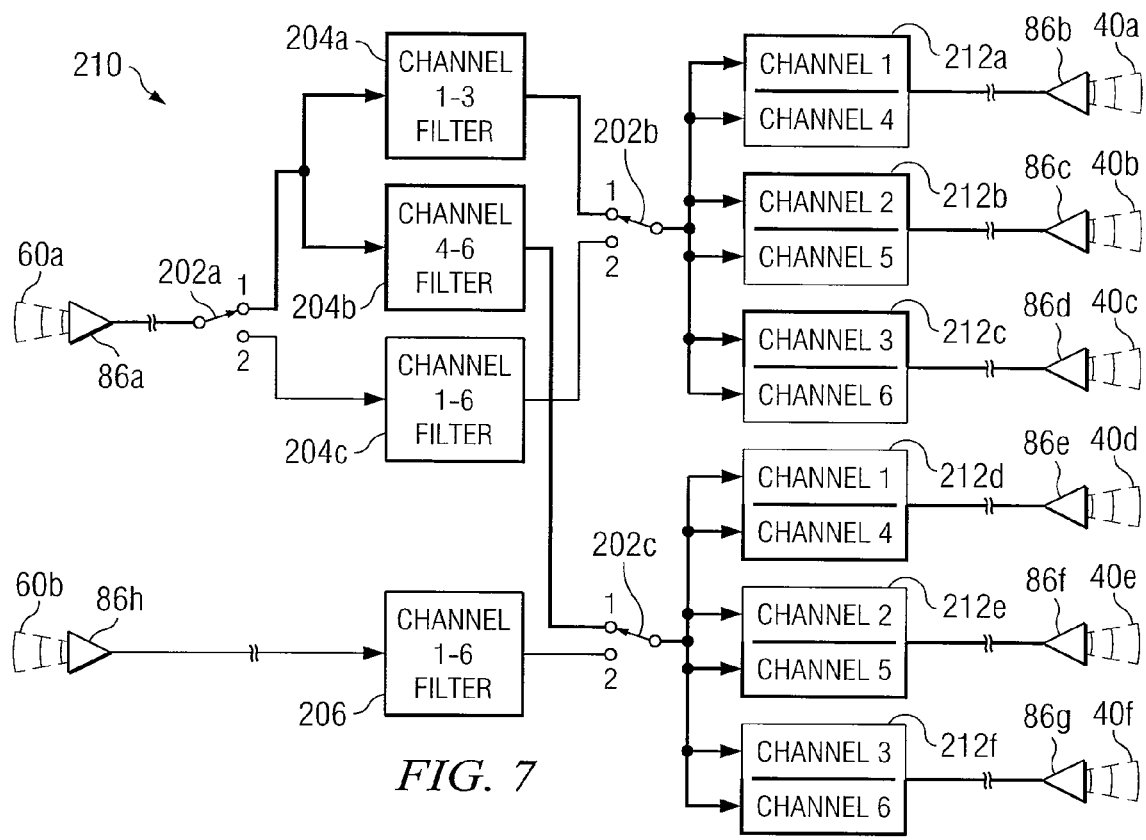
FIGS. 7 and 8 illustrate example components that may be used to provide incremental capacity for a network-access satellite.

FIG. 7 illustrates example components that may be included in payload 80 to provide incremental satellite capacity in the downstream direction using a filter-and-switch approach. In the example shown in FIG. 7, a single gateway 20 may be used initially to provide network-access to user terminals 32 located in six spot beam coverage regions 30 associated with six different spot beams 40. Using these components, incremental capacity may be added through the use of switches 202 and the addition of an additional gateway 20. In this initial configuration, all of the switches 202 are set to position "1" to support six spot beam coverage regions 30 with a single gateway 20. Moving from left to right in FIG. 7, the communication signals are initially received at feed horn 86a from beam 60a. In the single gateway configuration, the signals received at feed horn 86a pass through switch 202a (set at position "1") and into channel filters 204a and 204b. Communication signals for channels 1 through 3 pass from channel filter 204a through switch 202b (set at position "1")

and into power combiners 212a through 212c. Using these components, the communication signals associated with channel 1 are transmitted by feed horn 86b to one or more user terminals 32 through spot beam 40a. Similarly, the communication signals associated with channel 2 are transmitted by feed horn 86c and the communication signals associated with channel 3 are transmitted by feed horn 86d. The communication signals associated with channels 4 through 6 leave channel filter 204b, pass through switch 202c (set at position "1"), and arrive at power combiners 212d through 212f. Using these components the communication signals associated with channel 4 are transmitted by feed horn 86e to one or more user terminals 32 through spot beam 40d. Similarly, the signals associated with channel 5 are transmitted by feed horn 86f and the communication signals associated with channel 6 are transmitted by feed horn 86g.

Using the filter-and-switch approach illustrated, the capacity of satellite 10 may be increased by adding an additional gateway 20 to support the six spot beam coverage regions 30. In this configuration, all of switches 202 are set to position "2," such that feed horns 86b through 86d are supported by a first gateway 20 in communication with feed horn 86a and feed horns 86e through 86g are supported by a second gateway 20 in communication with feed horn 86h. In this configuration, moving from left to right in FIG. 7, the communication signals received at feed horn 86a pass through switch 202a (set at position "2") and into channel filter 204c. From channel filter 204c, the communication signals travel through switch 202b (set at position "2"), through power combiners 212a through 212c, and are then transmitted by feed horns 86b through 86d. The communication signals received by feed horn 86h pass through channel filter 206, through switch 202c (set at position "2"), through power combiners 212d through 212f, and are transmitted by feed horns 86e through 86g.

Using the example filter-and-switch approach illustrated, spot beams 40a through 40f may be serviced at half capacity using a single gateway 20, as shown in FIG. 7 with switches 202 set at position "1," or serviced at full capacity using two gateways 20, as shown in FIG. 7 with switches 202 set at position "2." The filter-and-switch approach for use in the upstream direction may be implemented in a similar manner.

In alternative embodiments, incremented capacity may be provided with fewer filters and switches than used with the "filter-and-switch" approach. For example, such incremental capacity may be provided using a "direct-connect" approach. Using the direct-connect approach, gateways 20 may be connected to spot beams 40 such that a first portion of each spot beam 40 capacity may be serviced by a first gateway 20 and a second portion of each spot beam 40 capacity may be serviced by a second gateway 20. This approach can be extended and scaled to allow various portions of the capacity of particular spot beams 40 to be serviced by multiple gateways 20, such that the operational capacities of these particular spot beams 40 increase in increments as each additional gateway 20 is built and activated.

Figure 8:
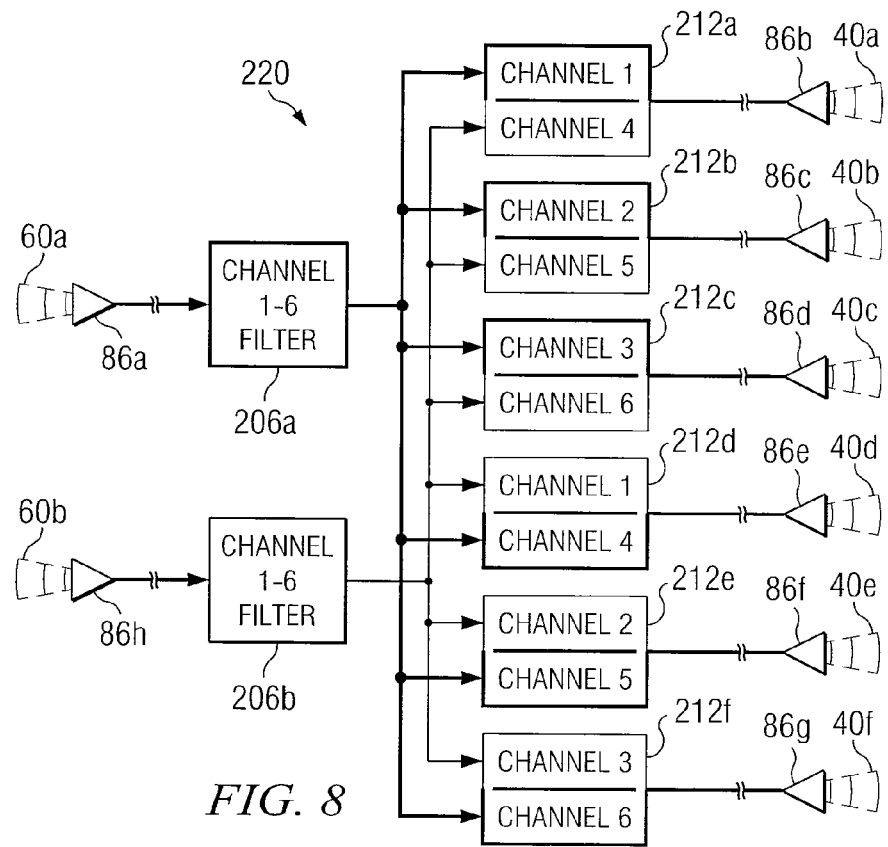

FIG. 8 illustrates example components that may be included in satellite payload 80 to provide incremental capacity in the downstream direction using a direct-connect approach. In the example shown, a single gateway 20 may be used to initially provide network access to user terminals 32 located in six spot beam coverage regions 30 associated with six different feed horns 86. Using these components, incremental capacity may be added without changing the configuration of the components in satellite payload 80. Moving from left to right in FIG. 8, the communication signals are initially received at feed horn 86a through beam 60a. The communication signals received at feed horn 86a are directed through channel filter 206a. From channel filter 206a, the communications signals are split and directed through six frequency selective power combiners. In the embodiment shown, the communications signals are split into six different wave paths; however, in alternative embodiments, other variations may be used with an alternative number of wave paths and/or power combiners.

As shown in FIG. 8, the communication signals received by feed horn 86a are filtered by channel filter 206a, split, directed through six different frequency selective power combiners 212a through 212f and transmitted by feed horns 86b through 86g. The communication signals received by feed horn 86h are directed to channel filter 206b. From channel filter 206b, the communications signals are split six ways through the use of a microwave signal splitter or other appropriate device. In the embodiment shown, the communications signals are split into six different wave paths; however, in alternative embodiments, other variations may be used with an alternative number of wave paths. In addition, although the number of wave paths used for the communications signals received by feed horn 86a is the same as the number of channels utilized for the communications signals received by feed horn 86h, in alternative embodiments, these numbers may vary from each other, such that the one-to-one ratio is not maintained. Each channel of communication signals is then directed through a frequency selective power combiner in communication with a feed horn 86. In alternative embodiments, rather than utilize a signal splitter and a frequency selective power combiner, a multiplexer and a power combiner may be used.

In embodiments in which a single gateway 20 is transmitting communication signals through beam 60a to feed horn 86a, spot beams 40a through 40f may be serviced at half capacity. In embodiments in which two gateways 20 are transmitting communication signals and these communication signals are received at feed horns 86a and 86h through beams 60a and 60b, power combiners 212 combine selected channels of communication signals received from both feed horns 86a and 86h. As shown in FIG. 8, in certain embodiments, the channels selected to be combined in each of power combiners 212a through 212f may be selected such that each power combiner frequency selects two distinct channels to avoid interference. By combining the communication signals from beams 60a and 60b, spot beams 40a through 40f may be serviced at full capacity. The direct-connect approach for use in the upstream direction may be implemented in a similar manner.

The direct-connect approach, may provide a lower cost and increased reliability solution for a network-access satellite with incremental capacity. For example, the direct-connect approach may be less expensive than the filter-and-switch approach because the direct-connect approach does not require the added weight and cost of additional filters and switches. As another example, the direct-connect approach may be more reliable because it utilizes fewer switches and filters in the primary signal path than the filter-and-switch approach. In certain embodiments, the provision of incremental capacity may allow each spot beam 40 to be serviced by multiple gateways, such that only a portion of the capacity is lost if a gateway 20 suffers an outage. Certain embodiments may easily be scaled to any number of gateways 20 and any number of associated spot beams 40. In certain embodiments, satellite payload 80 may be configured such that certain spot beams 40 have one associated gateway 20, certain spot beams 40 have two associated gateways 20, certain spot beams 40 have three associated gateways 20, etc.

Non-Contiguous Beams

Demand for network-access satellite services may be non-uniform within satellite coverage area 34. In certain embodiments, network-access satellite communication system 100 may be configured to provide non-uniform capacity within satellite coverage area 34. For example, system 100 may be configured to provide (1) larger spot beams 40 to cover lower density spot beam coverage regions 30; (2) lower bandwidth for spot beams 40 covering lower density spot beam coverage regions 30; (3) lower power transmitters to serve spot beams 40 covering lower density spot beam coverage regions 30; and (4) non-contiguous spot beams 40. Non-contiguous beams may provide both non-uniform capacity and flexibility to balance capacity across two or more beams without physical switching or processing on satellite 10. An example non-contiguous beam may be implemented as two or more downstream spot beams 40 that may transmit identical, or substantially identical, communication signals over the same channel to multiple non-contiguous spot beam coverage regions 30 and as two or more upstream spot beams 40 that may be received and processed by payload 80 as a single spot beam 40 or as a single channel.

Transmitters 32 throughout the non-contiguous spot beam coverage regions 30 may share the same increment of satellite capacity. In particular, satellite 10 may transmit the same downstream signal to all transmitters 32 in multiple non-contiguous spot beam coverage regions 30 and may process upstream signals from transmitters 32 in multiple non-contiguous spot beam coverage regions 30 as if they were located in a single spot beam coverage region 30. In certain embodiments, the downstream signal may be power divided into two or more signals, which may occupy the same bandwidth and may have equal or unbalanced power. These signals may then be transmitted using two or more feed horns 86 to two or more non-contiguous and non-overlapping spot beam coverage regions 30. In the upstream direction, receive signals from two or more feed horns 86 may be power combined and processed as a single signal. This approach may be scaled to any number of spot beam coverage regions 30.

In certain embodiments, capacity may be efficiently shared across multiple spot beam coverage regions 30 using, for example, time domain techniques such as time division multiple access (TDMA) technology. In a satellite network where each user terminal 32 performs turn-around ranging, either to the satellite or through the satellite, to establish a time delay reference, user terminals 32 in each spot beam coverage region 30 supported by a single communication channel may share capacity on a single TDMA waveform.

In certain embodiments, the use of non-contiguous spot beams 40 may allow shared capacity across multiple spot beam coverage regions 30 supported by a single communication channel. In certain embodiments, the use of non-contiguous spot beams 40 may allow spot beam coverage regions 30 to be the same size and shape as other spot beam coverage regions 30 in a uniform pattern within satellite coverage area 34, which may provide improved performance and may minimize interference in a tightly packed pattern of spot beam coverage regions 30. In certain embodiments, the use of non-contiguous spot beams 40 may provide for the shared use of the identical, or substantially identical, signals, (including burst rates, bandwidths, and waveforms) in beam areas where the demand for network access may be dramatically lower than the average beam capacity.

Figure 9:
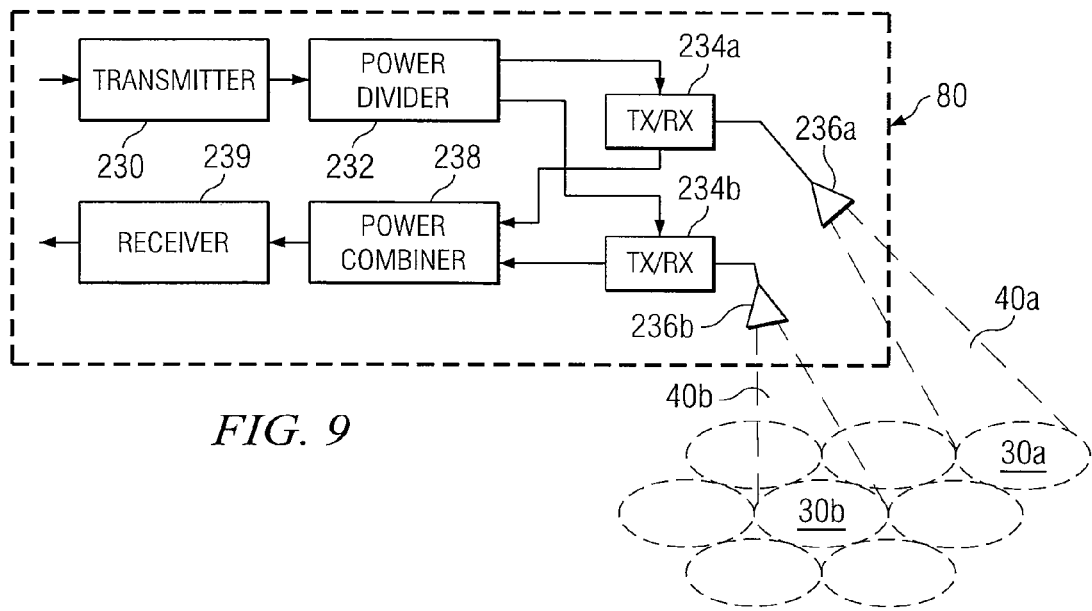
FIG. 9 illustrates example components that may be used to implement non-contiguous beams.

FIG. 9 illustrates example components that may be included in payload 80 to implement non-contiguous spot beams 40, according to particular embodiments. The components illustrated in FIG. 9 may be used in combination with and/or as an alternative to one or more of the components illustrated in FIG. 4, 5, or 6A-6B. In the embodiment shown, signals generated by transmitter 230 are passed to power divider 232 which then passes the signals on to both transceiver 234a and transceiver 234b. As used herein, a transceiver is a device configured to allow upstream and downstream signals to be transmitted and/or received through the same node, device, and/or path. In certain embodiments, a transceiver may or may not include or be coupled to a diplexer, a transmit-receive filter, or other similar device.

Signals from transceiver 234a are then transmitted by feed horn 236a through spot beam 40a to spot beam coverage region 30a. Similarly, signals from transceiver 234b are transmitted by feed horn 236b through spot beam 40b to spot beam coverage region 30b. Through the use of these components, a single signal generated by transmitter 230a may be distributed to two non-contiguous spot beam coverage regions 30a and 30b. Similarly, signals generated by one or more transmitters within spot beam coverage region 30a may be transmitted through spot beam 40a and received by feed horn 236a. These signals may then be directed through transceiver 234a and into power combiner 238. At the same time, signals generated by one or more transmitters 32 within spot beam coverage region 30b may be transmitted through spot beam 40b and received by feed horn 236b. These signals may be directed through transceiver 234b and into power combiner 238. The signals generated by transmitter 32 within spot beam coverage regions 30a and 30b may be combined within power combiner 238 and directed to receiver 239. In certain embodiments, techniques such as time-division multiplexing, frequency-division multiplexing, and code-division multiplexing may be used to combine communications signals associated with non-contiguous regions using a single channel or discrete frequency band.

Mitigating Rain Fade

Certain types of weather, especially the heavy rain often associated with thunderstorms, can cause significant propagation loss or attenuation of electromagnetic waves, particularly at microwave and millimeter wave frequencies. In a network-access satellite system, many tens of thousands of user terminals 32 may access network 70 through a single gateway 20. Disruptive weather between a particular gateway 20 and satellite 10 could result in disruption of service for all user terminals 32 who connect to network 70 through that particular gateway 20.

One approach to mitigating propagation loss or attenuation due to disruptive weather such as heavy rain (i.e., "rain fade" or "weather fade") is to build a second, backup gateway 20, which may be near the first gateway 20 but far enough away from the primary gateway 20 such that the probability of both gateways 20 being simultaneously affected by weather is diminishingly small. Using this approach, a second gateway 20 may be built for every primary gateway 20 that transmits signals to satellite 10. Using this approach, each second gateway 20 would not provide any additional capacity or generate any additional revenue. Another approach to mitigating weather fade is to build a utility gateway 250 with utility transceiver 252.

This approach utilizes satellite 10 with a net capacity that utilizes a number of operational gateways 20, for example N, and also utilizes a utility gateway, for a total of N+1 gateways. The utility gateway can take over the functions of any one of the N operational gateways. The satellite is designed with commandable switching, either automatic or by ground control, to switch capacity from a gateway 20 suffering propagation loss or attenuation and at risk of outage to the utility gateway. A single utility gateway may provide a weather diversity site capable of backing up any of the operational gateways 20 on a "one at a time" basis. In certain embodiments, network-access satellite communications system 100 may utilize more than one utility gateway.

Figure 10A:
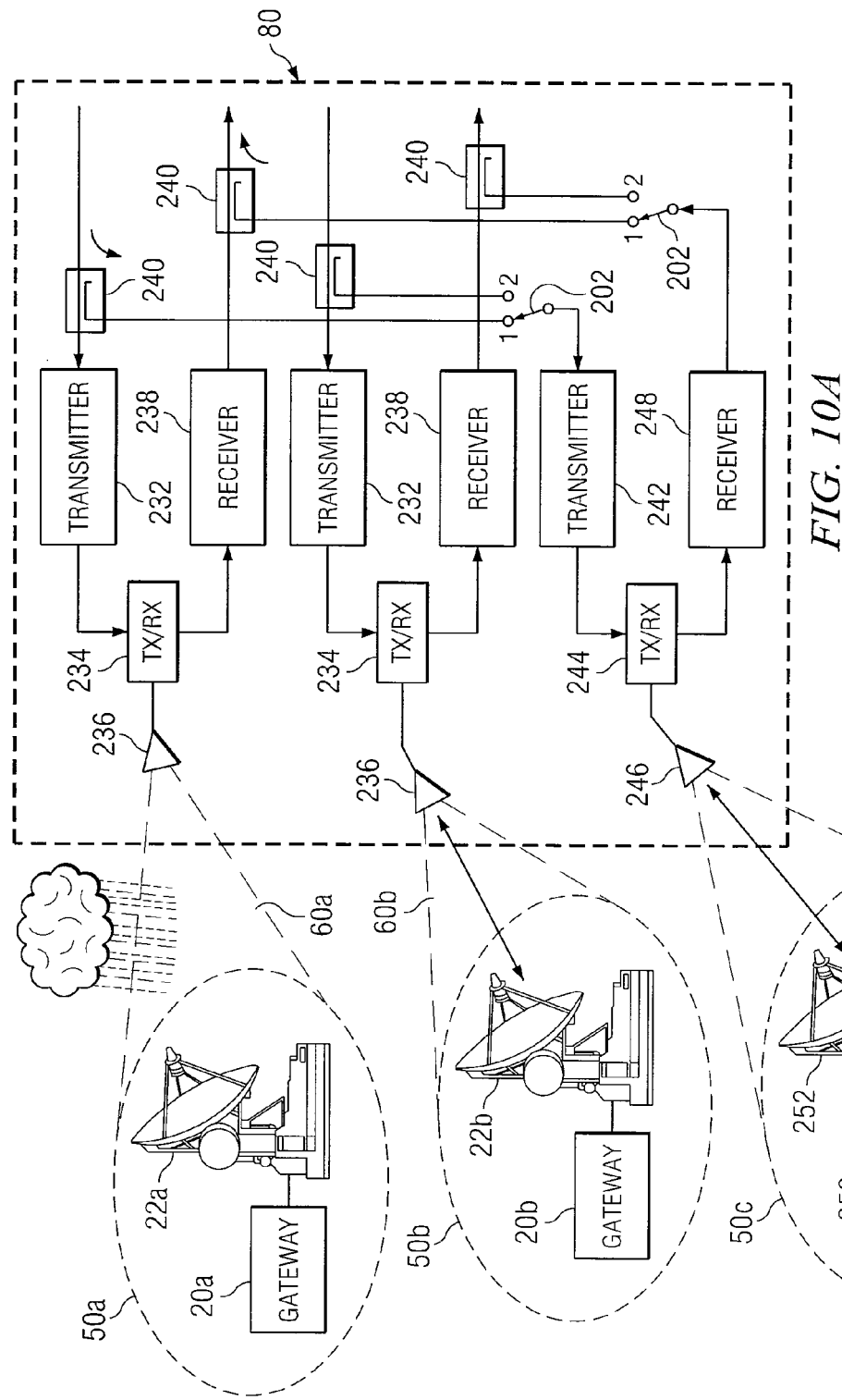
FIGS. 10A through 10C illustrate example components that may be used to implement a utility gateway.

FIG. 10A illustrates example components that may be used to implement a utility gateway for use in mitigating weather fade and/or disaster at an operational gateway. In the embodiment shown, the components are utilized to implement two operational gateways 20a and 20b and a single utility gateway 250. In alternative embodiments, any number of operational gateways and utility gateways may be implemented using similar components. FIG. 10A is intended to illustrate only those components which may be included in payload 80 to implement the utility gateway function, according to certain embodiments. In various embodiments, the components illustrated in FIG. 10A may be used together with some or all of the components illustrated in FIG. 4, 5, or 6A-6B.

In the embodiment shown in FIG. 10A, for each operational gateway 22, payload 80 includes a transmitter 232, a transceiver 234, a feed horn 236, and a receiver 238. These components may be utilized together with other components in payload 80 to transmit and/or receive communication signals to and/or from gateway 22 through beam 60. In certain embodiments, a utility gateway may be implemented by the addition of directional couplers 240, switches 202, transmitter 242, transceiver 244, feed horn 246, and receiver 248. For example, in the event of rain fade experienced at gateway 20a, switches 202 may be set to position "1." Utility gateway 250 may then be used to transmit and/or receive communication signals previously associated with operational gateway 20a. Similarly, in the event of rain fade experienced at operational gateway 20b, switches 202 may be set to position "2." Utility gateway 250 may then be utilized to transmit and/or receive signals previously associated with operational gateway 20b. In certain embodiments, switches 202 may have additional positions, such as an off position. Although directional couplers are discussed herein as an example component that may be utilized to combine or split a signal, any appropriate active or passive combiner or splitter may be used to perform the functions provided by a directional coupler. In certain embodiments, as an alternative to or in addition to directional couplers 240 or other appropriate active or passive combiner or splitter, one or more switches may be utilized to direct communication signals to and/or from utility gateway 250.

An example of the utility gateway concept is shown in FIG. 10A for the case where the functions of any one of two operational gateways 20 may be replaced by a utility gateway 250. In certain embodiments, the transition of communications traffic from an operational gateway 20 to utility gateway 250 may be performed all at once. As an alternative, the transition of communications traffic may be performed incrementally. For example, the transition of communication traffic may be performed incrementally by channel or by other category.

In certain embodiments, the use of utility gateway 250 may substantially mitigate the risk of service disruptions at multiple operational gateways 20 by serving as a backup for multiple operational gateways 20 on a one-at-a-time basis. In addition, the use of utility gateway 250, that can serve as a backup for multiple operational gateways 20, may be less expensive than building backup gateways for each operational gateway 20 on a one-to-one basis. In particular embodiments, utility gateway 250 may be located far enough from any operational gateway 20 that the likelihood of a single storm affecting both an operational gateway 20 and a utility gateway 250 is nearly zero. In certain embodiments, a utility gateway 250 may be located in a dry area, such as in a desert, or on a mountain top where the likelihood of a disruptive rain event at utility gateway 250 is diminishingly small.

A number of extensions of the utility gateway for weather related outages can be envisioned, including (1) extending the concept to two or more utility gateways 250 to provide protection from simultaneous disruptive events at operational gateways 20; and (2) utilizing an operational gateway 20 with adequate available capacity as a partial utility gateway to take over at least a portion of the functions of another operational gateway suffering disruption or weather propagation loss or attenuation.

Disaster Recovery

Gateways may be vulnerable to electrical failures, fire, flood, tornado, physical destruction, sabotage, or other risks that could result in the gateway being non-operational for an extended period of time. Methods to mitigate these risks may include any combination of careful site location, facility hardening, and construction of backup gateways. Alternative methods may include the utilization of a transportable gateway which can be brought to or near the damaged gateway to quickly provide temporary service until the damaged gateway can be repaired. As yet another alternative, a utility gateway may be utilized to mitigate the risk of a disaster at an operational gateway. By utilizing a utility gateway, a satellite operator may transfer all or a portion of the load from a failed, damaged or otherwise non-operational gateway to a utility gateway to quickly restore service. A satellite may utilize multiple utility gateways to provide simultaneous protection against multiple events including weather and disaster related outages.

Network Management

In certain embodiments, a utility gateway 250 may be utilized to monitor, on a non-interference basis, the signals from one or more selected operational gateways 20 to satellite 10 and/or signals from satellite 10 to those selected operational gateways 20. A utility gateway 250 with monitoring capabilities may be utilized to facilitate network management by evaluating power levels, signal quality, loading levels, interference, and other key parameters associated with the selected operational gateways 20. Utility gateway 250 may utilize a single instance of monitoring equipment to monitor an operational gateway's full downstream and upstream communications traffic without using any of the operational gateway's bandwidth or reducing its capacity.

In order to monitor an operational gateway 20, the downstream communications traffic from the operational gateway 20 to satellite 10 is transmitted by satellite 10 to user terminals 32, and a copy of the downstream traffic is also transmitted by satellite 10 to the utility gateway 250. In a similar manner, satellite 10 may transmit a copy of the upstream communications traffic that is transmitted from satellite 10 to the operational gateway 20 to utility gateway 250 for monitoring.

Figure 10B:
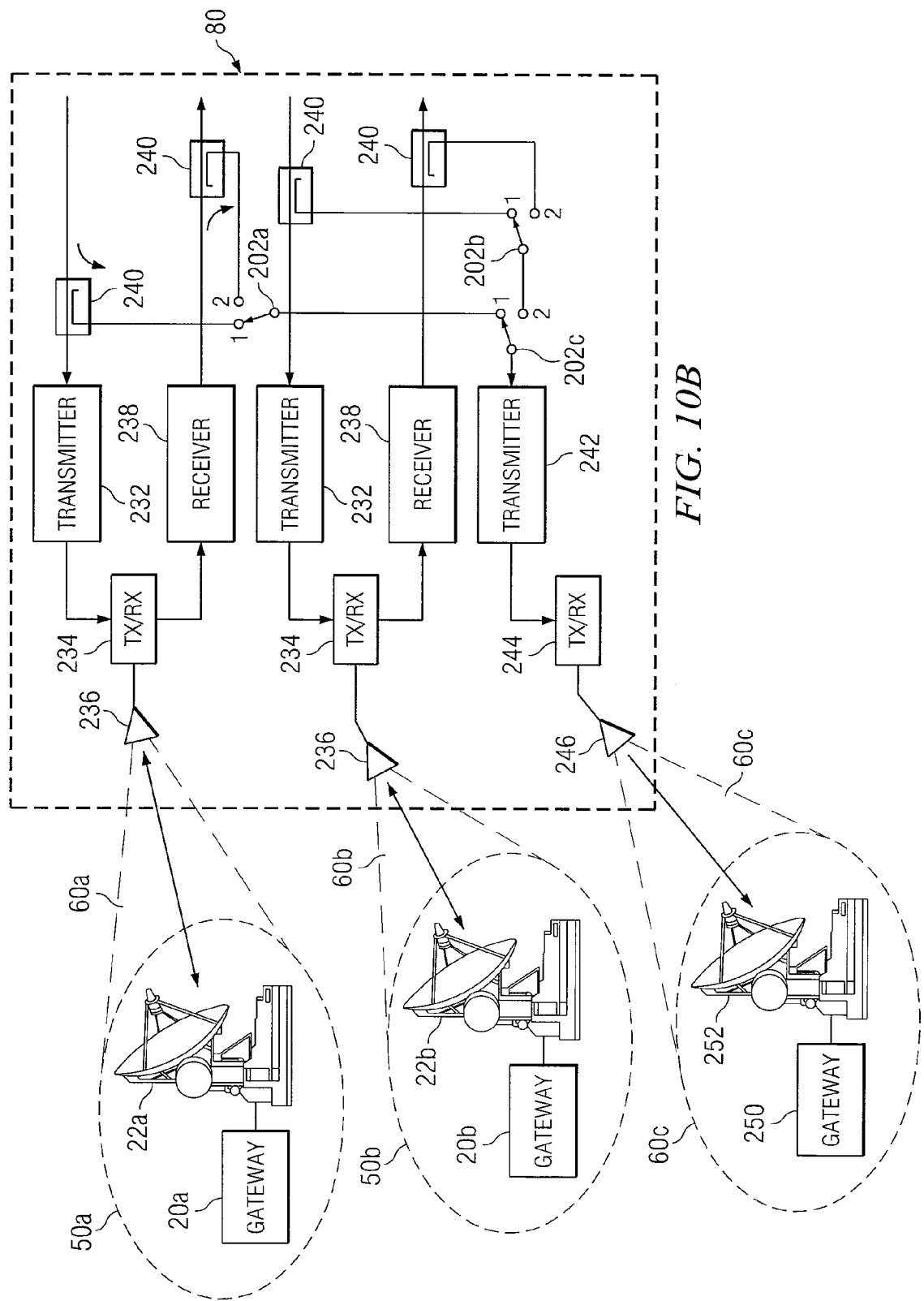

FIG. 10B illustrates example components that may be used to implement a utility gateway 250 for use in network management. FIG. 10B is intended to illustrate only those components which may be included in payload 80 to implement a utility gateway 250 for use in network management, according to certain embodiments. In various embodiments, the components illustrated in FIG. 10B may be used together with some or all of the components illustrated in FIG. 4, 5, or 6A through 6B. In the embodiment shown, the example components may be utilized to monitor upstream and/or downstream traffic from one of operational gateways 20a and 20b, without disrupting the communication traffic to and/or from either of operational gateways 20a and 20b. Through the use of switches 202, a selection may be made as to which portion of communications traffic will be monitored by utility gateway 250 at any given time. For example, in order to monitor upstream network traffic at operational gateway 20a, switch 202a may be set to position "1" and switch 202c may be set to position "1," as illustrated in FIG. 10B. As another example, downstream communications traffic may be monitored at operational gateway 20a by setting switch 202a to position "2" and setting switch 202c to position "1." Communications traffic may be similarly monitored by setting switch 202c to position "2," and setting switch 202b to either position "1" or "2" to monitor upstream or downstream traffic, respectively.

In certain embodiments, both the downstream and upstream communications traffic may be monitored simultaneously. In alternative embodiments, satellite 10 may be designed to monitor either upstream or downstream communications traffic; the selection being either on a rotating basis, automatically selected by satellite 10, or in response to a command. Satellite 10 may also be designed to simultaneously monitor a portion, for example half, of the upstream traffic and a portion of the downstream traffic; the particular portion being selected either on a rotating basis, automatically selected by satellite 10, or in response to a command.

Real-Time Performance Measurement

Some satellites utilize beams that transmit signals to a national or continental size region. For these satellites, a satellite operator may monitor the performance of all of the signals being transmitted by the satellite from a single site within these national or continental regions. In contrast, a spot-beam satellite may have tens, hundreds, or even more beams, with each beam directed to a smaller region. For these spot-beam satellites, it may be difficult for a satellite operator to establish, operate, and maintain monitoring facilities within each of these regions.

In certain embodiments, rather than monitoring downstream and upstream communications traffic for an operational gateway 20 through the use of monitoring facilities located in many or all of these regions, a utility gateway 250 may be utilized to monitor the corresponding downstream (satellite to end-user) and upstream (end-user to satellite) communication traffic associated with an operational gateway 20. In this manner, a utility gateway 250 may be utilized to emulate end-users and perform two-way communications between these emulated end-users and the associated operational gateway 20.

In certain embodiments, a number of end-users may be emulated at utility gateway 250 for test and monitoring purposes. In certain embodiments, connectivity, speed, quality of service, and other performance measurements may be determined for the operational gateway 20 being evaluated based on an evaluation of communications signals, test signals, or simulated user terminal signals. In certain embodiments, a suite of end-user terminals may be emulated and connected, logically or by channel and band, into every beam, carrier, or group of actual end-users being serviced by the operational gateway 20. In this manner, the satellite operator may obtain real-time performance measurements as if the monitoring equipment were remotely located in each spot beam coverage region 30. In certain embodiments, an ability to monitor the signals in all, or substantially all, of spot beams 40 across an entire network from a single site may greatly improve capabilities to manage network performance.

Figure 10C:
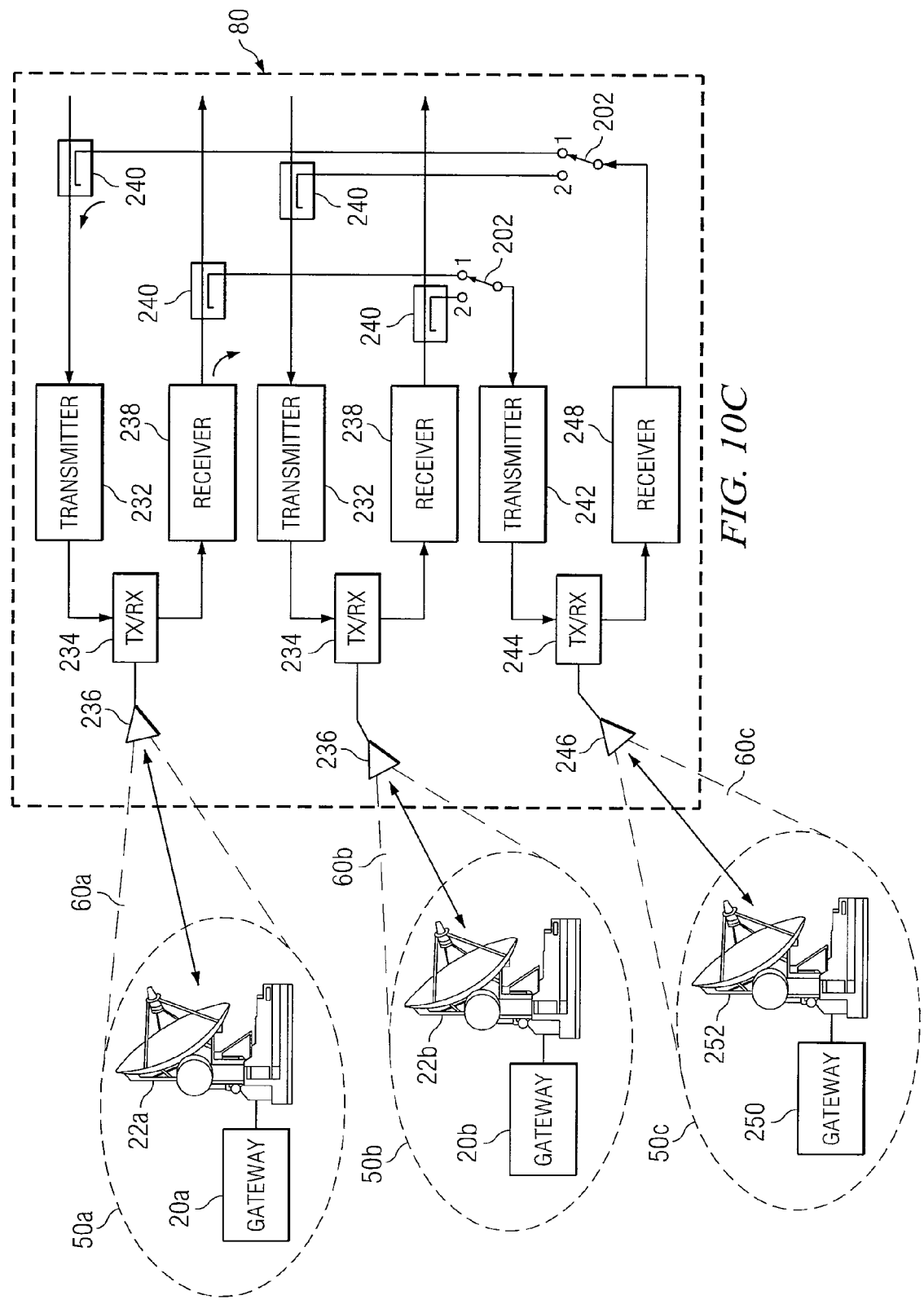

FIG. 10C illustrates example components that may be used to implement a utility gateway 250 for use in performance measurement. FIG. 10C is intended to illustrate only those components which may be included in payload 80 to implement a utility gateway 250 for use in performance measurement, according to certain embodiments. In various embodiments, the components illustrated in FIG. 10C may be used together with some or all of the components illustrated in FIG. 4, 5, or 6A through 6B. In the embodiment shown, the example components may be utilized to monitor downstream and upstream communication traffic associated with a selected operational gateway 20, without disrupting the communication traffic to and/or from the selected operational gateway 20. In the embodiment shown, the example components allow utility gateway 250 to selectively monitor communications traffic associated with either gateway 20a or gateway 20b. In alternative embodiments, components may be similarly configured to allow a particular gateway 250 to selectively monitor communications traffic associated with a different number of operational gateways 20. As shown in FIG. 10C, when switches 202 are set to position "1," the communications signals transmitted by gateway 250 through beam 60c and received by feed horn 246 are received by receiver 248 and coupled to the communications signal input to transmitter 232 for transmission through feed horn 236 to operational gateway 20a. Similarly, communications signals transmitted from gateway 20a through beam 60a are received by receiver 238 and directed to transmitter 242 using directional coupler 240. From transmitter 242, the signals are further directed through beam 60c to gateway 250. Through the use of these components, with switches 202 set to position "1," gateway 250 may emulate a user terminal 32 and measure the connectivity, speed, quality of service, and other performance metrics over a complete communications path similar to the path utilized by an end-user at a user terminal 32. As shown in FIG. 10C, by setting switches 202 to position "2," gateway 250 may be utilized to emulate end-users associated with gateway 20b. In certain embodiments, gateway 250 may be allowed to emulate end-users associated with various operational gateways 20 on a rotating basis, according to an automatically selected pattern, or in response to a command.

Earth-Based Power Control Beacon

A beacon transmitter may be utilized on satellite 10 to transmit a known signal down to earth at a carefully controlled constant power level. By monitoring the beacon signal down on the earth, the signal path losses between the satellite and the earth station of interest may be determined.

A satellite operator may monitor satellite beacon power to maintain their earth-to-space signals, such that the signals arrive at the satellite at a constant power level. If the satellite beacon power changes, due to rain or other phenomena along the line of sight, the satellite operator may adjust his earth station transmitter power by a corresponding amount to maintain a constant level at the satellite. Maintaining a constant signal power level at the satellite in this manner may reduce interference and improve satellite performance.

Through the use of a satellite beacon a satellite operator may control the earth-based transmitters used to send signals up to satellite 10, but they provide little ability to control the transmitter power level on board a satellite 10. On spot-beam satellite 10, the communications link from satellite 10 down to a gateway earth station 20 may consist of hundreds or thousands of subscriber signals. By controlling the power level of a satellite-to-gateway transmitter the performance of satellite 10 may be improved.

In certain embodiments, the power level of a satellite-to-gateway transmitter may be controlled through the use of an earth-based beacon transmitter. This earth-to-space beacon signal may be received at satellite 10 and transmitter power on satellite 10 may be dynamically and/or automatically adjusted based on the beacon signal power received. In certain embodiments, the use of dynamic and/or automatically adjusted transmitter power may allow a transmitter to be operated at low power in low-loss conditions and then operated at increased power levels only when the loss along the propagation path increases. In certain embodiments, the use of dynamic and/or automatically adjusted transmitter power may allow for (1) lower average power consumption on the satellite; (2) less self-generated interference or distortion in low-loss conditions; and (3) ability to rapidly increase satellite transmitter power when the loss along the propagation path increases to reduce outages.

Figure 11:
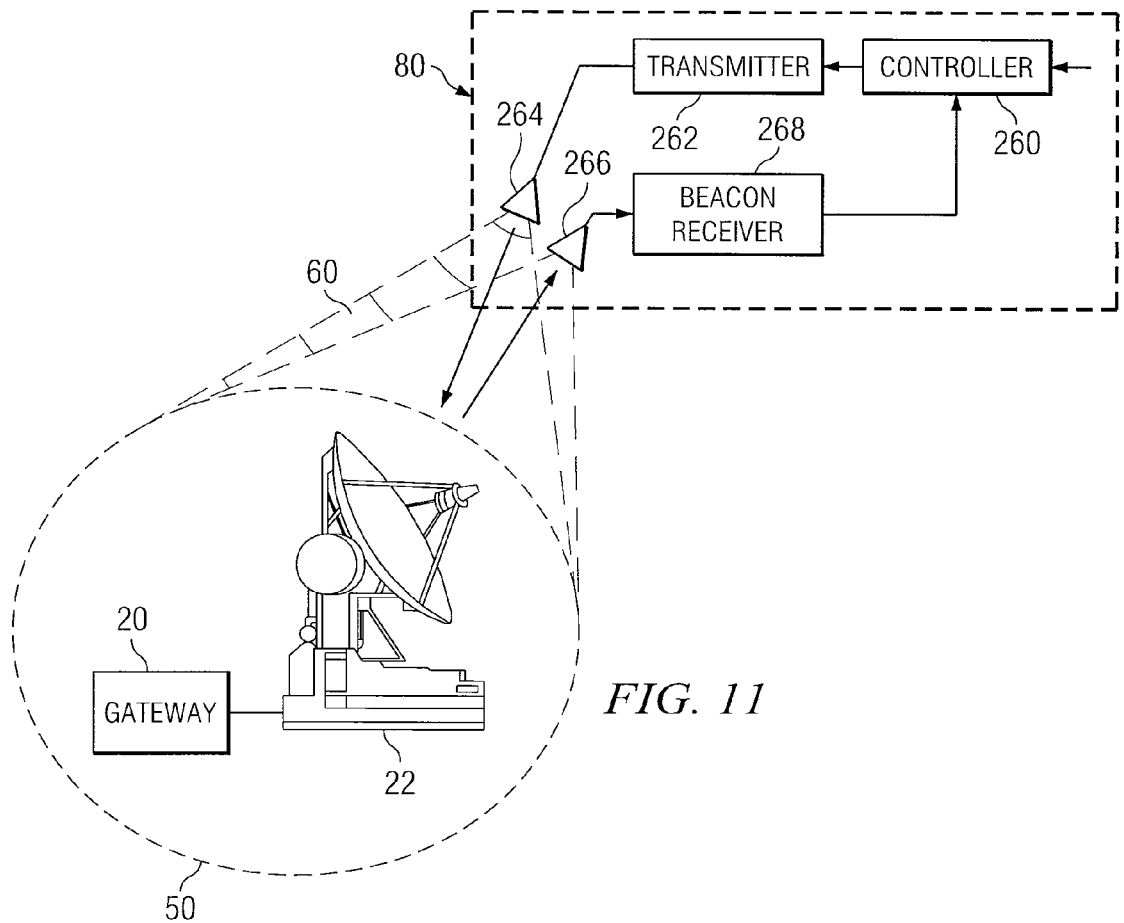
FIG. 11 illustrates example components that may be used to control signal power.

FIG. 11 illustrates example components that may be used to control transmitter power level on board satellite 10. FIG. 11 is intended to illustrate only those components which may be included in payload 80 to implement an earth-based power control beacon, according to certain embodiments. In various embodiments, the components illustrated in FIG. 11 may be used together with some or all of the components illustrated in FIG. 4, 5, or 6A through 6B. In the embodiment shown in FIG. 11, an earth-based beacon signal may be received through feed horn 266 and directed to beacon receiver 268. Beacon receiver 268 is coupled to controller 260 and information or signals from beacon receiver 268 may be used as input to controller 260 which controls the power level for transmitter 262. In this way, the earth-based beacon may be used to control the signal power transmitted through beam 60 to gateway 20 within gateway region 50. In the embodiment shown, feed horn 266 is focused toward gateway region 50 to receive a beacon signal from an earth-based beacon located within gateway region 50. In this embodiment, both the earth-based beacon and gateway 20 would be co-located within the same gateway region 50. By locating the earth-based beacon in proximity to gateway 20, any signal loss along the propagation path from the earth-based beacon to satellite 10 could be used to approximate the correlating signal loss between satellite 10 and gateway 20. However, in alternative embodiments, one or more earth-based beacons may be located outside gateway region 50.

Figure 12:
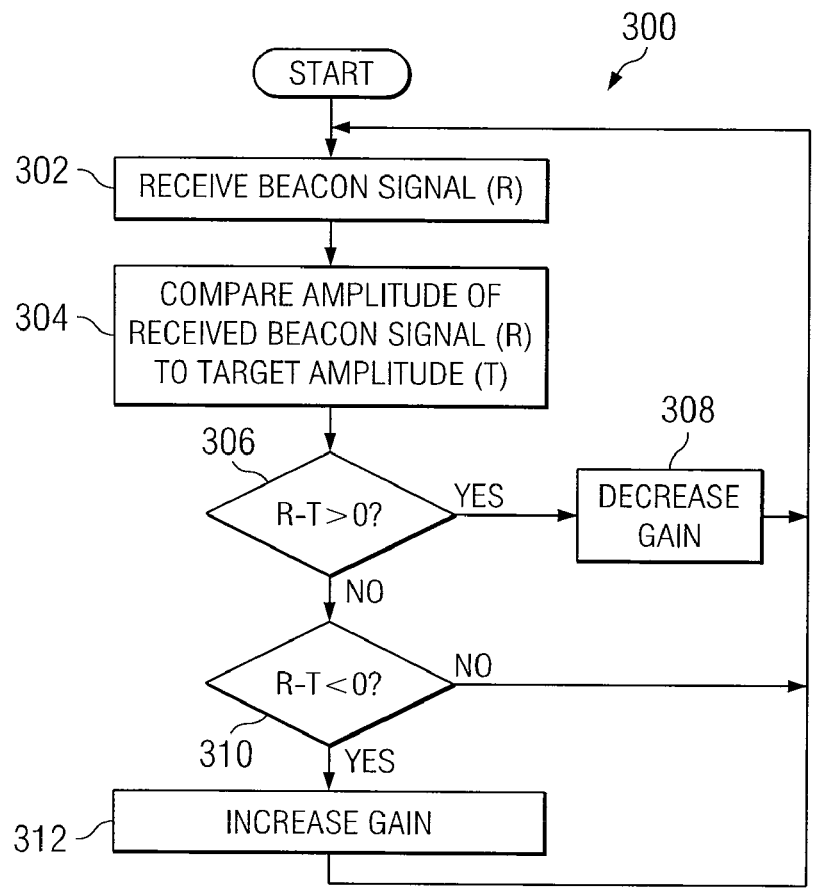
FIG. 12 illustrates an example method for use in controlling signal power.

FIG. 12 illustrates an example method 300 for use in controlling transmitter power level on board satellite 10. At step 302, satellite 10 receives a beacon signal having an amplitude (R). At step 304, the amplitude of the received beacon signal (R) is compared to a target amplitude (T). At step 306, if the amplitude of the received beacon signal (R) minus target amplitude (T) is greater than zero, then at step 308 the gain for the signal transmitter is decreased. If at step 310, the amplitude of received beacon signal (R) minus target amplitude (T) is less than zero, then the gain for the transmitter is increased. As shown in FIG. 12, according to certain embodiments, if the amplitude of received beacon signal (R) is equal to target amplitude (T), then no change is made to the transmitter gain. Through the use of method 300, the transmitter power level for satellite 10 may be controlled by comparing the amplitude of a received beacon signal to a target amplitude.

Distortion Based Power Control

In some satellite transmitters, particularly satellite transmitters used to amplify multiple simultaneous signals distributed across the bandwidth of interest, the power levels at which the transmitter provides acceptable performance may be half or less than half of the transmitter's maximum power. One way to control the power level of a satellite transmitter is to perform an automatic level control (ALC) function for the signal prior to the input to the transmitter, such that fluctuations in the input signal level are effectively negated and the transmitter is maintained at a selected operating point relative to the transmitter's maximum power.

On a spot-beam satellite, the number of upstream signals, the power levels of those signals, and therefore the total signal power at the input to the satellite-to-gateway transmitter on the satellite may be determined by end-user loading. During off-peak periods, the number of signals at the input to the satellite transmitter may be nearly zero; while during peak periods, the number of signals at the input to the satellite transmitter may be hundreds or thousands. The use of ALC techniques may be insufficient when the variation in the number of signals and signal power at the transmitter input is large. For example, even under a fixed gain approach, the satellite amplifier power level may vary considerably as a function of the number of signals present.

In certain embodiments, a satellite transmitter may be maintained at a constant or substantially constant distortion level. In particular embodiments, constant distortion level may be achieved by injecting a reference signal into the transmitter input and monitoring the resulting distortion associated with that reference signal. In these embodiments, total input power to the transmitter may be adjusted up or down to maintain the distortion at a constant or substantially constant level. In certain embodiments, a reference signal may be injected into the transmitter input, at the edge of the band or in a particular band reserved for such purposes. For example, the reference signal may be selected to be in a range intended to cause little or no interference with the satellite-to-gateway signals. In certain embodiments, the use of distortion based power control may allow the satellite transmitter to operate efficiently at its maximum allowable power level (relative to acceptable distortion of the satellite-to-gateway signals) across a very wide range of variation in number and power levels of input signals.

Figure 13:
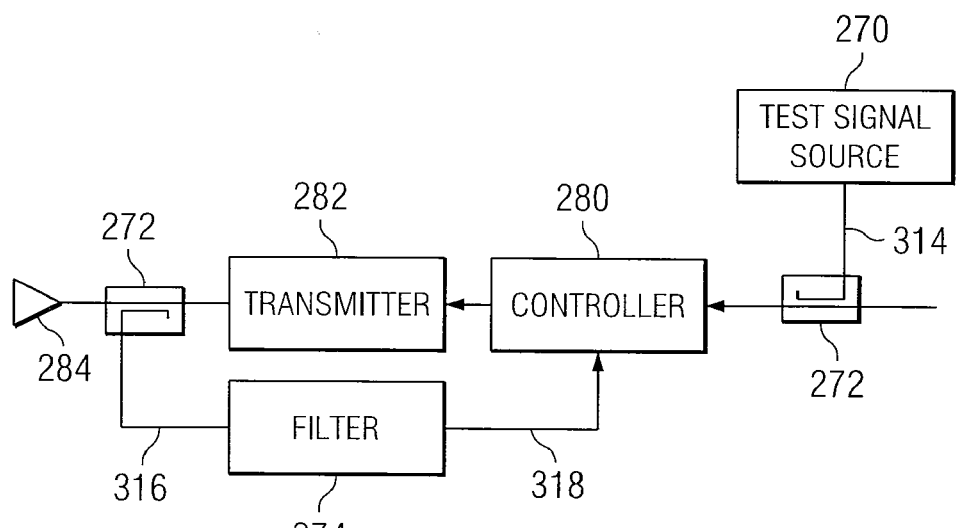
FIG. 13 illustrates example components that may be used to control signal power.

FIG. 13 illustrates example components that may be used to control signal power based on distortion. FIG. 13 is intended to illustrate only those components which may be included in payload 80 to control signal power based on distortion. In various embodiments, the components illustrated in FIG. 13 may be used together with some or all of the components illustrated in FIG. 4, 5, or 6A through 6B. As shown in FIG. 13, test signal source 270 generates test signal 314 that is coupled to an input signal through directional coupler 272. The test signal 314, together with the input signal, is directed through controller 280 and to transmitter 282. After passing through transmitter 282, which amplifies the input signal and test signal 314, a portion of the output signal (identified as distorted signal 316) is extracted using directional coupler 272 and passed to filter 274. Filtered signal 318 leaves filter 274 and is used as an input to controller 280. Controller 280 operates to adjust the gain for transmitter 282.

Figure 14:
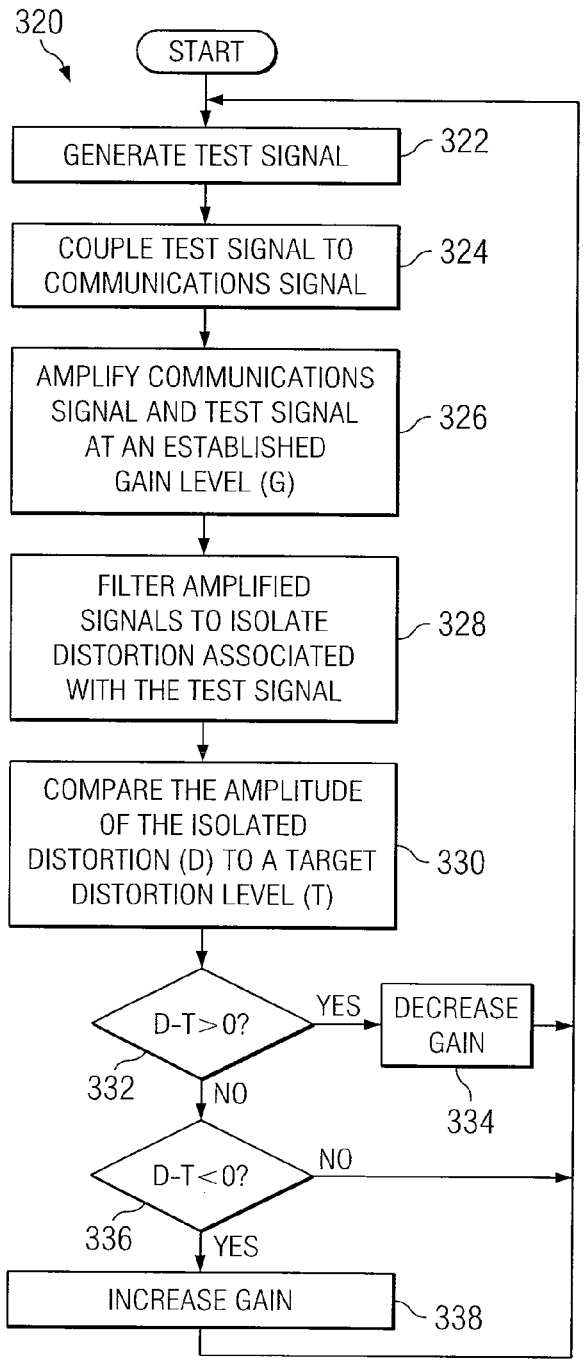
FIG. 14 illustrates an example method for use in controlling signal power.

FIG. 14 illustrates an example method 320 for distortion based control of signal power. At step 322, a test signal is generated. At step 324, the test signal is coupled to a communications signal. At step 326, the communications signal and the test signal are amplified at an established gain level (G). At step 328, the amplified signals are filtered to isolate distortion associated with the test signal. At step 330, the amplitude of the isolated distortion (D) is compared to a target distortion level (T). If, at step 332, the isolated distortion (D) minus the target distortion level (T) is greater than zero, then at step 334, the gain is decreased. If at step 336, the isolated distortion (D) minus the target distortion level (T) is less than zero, then at step 338, the gain is increased. Through the use of example method 320, the signal power transmitted by satellite 10 may be controlled based on distortion levels.

Figure 15A:
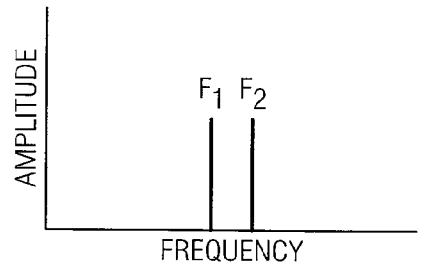
FIGS. 15A through 15C illustrate example signals associated with an example method for use in controlling signal power.
Figure 15B:
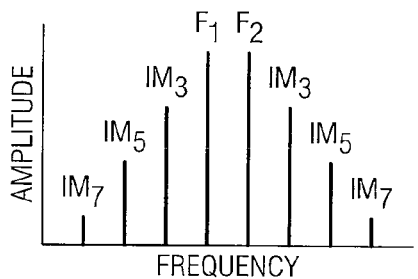
Figure 15C:
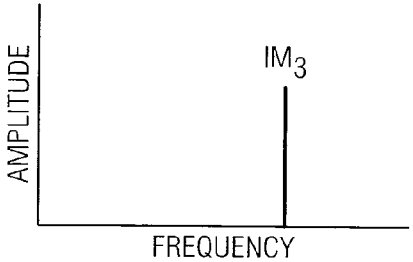

FIGS. 15A through 15C illustrate example signals associated with distortion based control of signal power. According to a particular embodiment, as shown in FIG. 15A, two narrowband tones of approximately equal power may be injected (along with the other transmitter input signals) into a satellite transmitter. A small sample of the transmitter output signal may be collected and the relative power level of the intermodulation product between these two tones may be monitored. The power level of the intermodulation product is a measure of the distortion being caused by the satellite transmitter. If the relative power level of the intermodulation product is less than the specified target, the gain prior to the transmitter is increased such that the input signal level increases causing the output power of the transmitter to increase. Similarly, if the relative power level of the intermodulation product is greater than the specified target, the gain prior to the transmitter is decreased such that the input signal level decreases causing the output power of the transmitter to decrease. This process is designed to maintain the power level of the intermodulation product at or near the specified target, ensuring that the transmitter operates at the highest possible power level that does not cause an unacceptable level of distortion.

Variations on this approach may include (1) monitoring the distortion of the actual transmitted signals rather than injecting a test signal; and (2) creating a narrowband notch in the bandwidth of the signal at the input to the transmitter, either in the transmitted bandwidth or just outside the transmitted bandwidth, and measuring transmitter distortion by monitoring to what extent the notch is filled by the transmitter.

Although the present invention has been described with several embodiments, a plenitude of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A satellite communications system that provides a redundant communication path for communications data that is transmitted between a satellite and a plurality of ground stations by providing at least one backup, earth-based, utility gateway for backing up multiple earth-based operational gateways comprising:
   a first microwave radiator configured to direct a first set of microwave signals to a first earth-based operational gateway that comprises one of said multiple earth-based operational gateways, said first set of microwave signals carrying a first subset of said communications data from a first user terminal located in spot beam coverage region;
   a first signal splitter configured to collect at least a portion of said first subset of said communications data from said first user terminal;
   a second microwave radiator configured to direct a second set of microwave signals to a second earth-based operational gateway that comprises one of said multiple earth-based operational gateways, said second set of microwave signals carrying a second subset of said communications data from a second user terminal;
   a second splitter configured to collect at least a portion of said second subset of said communications data from said second user terminal;
   a third microwave radiator configured to direct a selected one of said first set of microwave signals and said second set of microwave signals to said at least one backup, earth-based, utility gateway; and
   at least one selector on said satellite configured to selectively couple said third microwave radiator to a selected one of said first splitter and said second splitter in response to detection of propagation loss of one of said first set of microwave signals and said second set of microwave signals, such that said selected one of said first set of microwave signals and said second set of microwave signals is directed by said third microwave radiator to carry communications data collected from said selected one of the said first splitter and said second splitter to said at least one backup, earth-based, utility gateway.

2. The system of claim 1 further comprising:
   a first receiver configured to receive microwave signals from said first earth-based gateway, said first receiver coupled to a first combiner; and
   a second receiver configured to receive microwave signals from said second earth-based gateway, said second receiver coupled to a second combiner.

3. The system of claim 2 further comprising:
   a third receiver configured to receive microwave signals from said backup utility, earth-based gateway; and
   a second selector configured to selectively couple said third receiver to a selected one of said first combiner and said second combiner.

4. The system of claim 1 wherein at least one of said first, second, and third microwave radiators comprise a feed horn.

5. The system of claim 1 wherein at least one of said first splitter and second splitter comprise a directional coupler.

6. The system of claim 1 wherein said first selector comprises a switch.

7. A satellite communications system having at least one backup utility gateway for backing up multiple operational gateways comprising:
   a first feed horn disposed on a satellite that is configured to direct a first set of microwave signals to a first operational earth-based gateway, that comprises one of said multiple operational gateways, said first set of microwave signals carrying a first set of communications data from a first user terminal located in a spot beam coverage region;
   a first directional coupler, that is disposed on said satellite, that is configured to collect at least a portion of said first set of communications data from said first user terminal;
   a second feed horn, that is disposed on said satellite, that is configured to direct a second set of communications data to a second earth-based operational gateway that comprises one of said multiple operational gateways, said second set of microwave signals carrying a second set of communications data from a second user terminal;
   a second directional coupler, that is disposed on said satellite, that is configured to collect at least a portion of said second set of communications data from the second user terminal;
   a third feed horn, that is disposed on said satellite, that is configured to direct a selected one of said first set of communications data and said second set of communications data to an earth-based, utility gateway that comprises one of said at least one backup, utility gateways; and
   at least one switch, disposed on said satellite, that is configured to selectively couple said third feed horn to a selected one of said first directional coupler and said second directional coupler in response to detection of a propagation loss of one of said first set of communications data and said second set of communications data, such that said selected one of said first set of communications data and said second set of communications data is directed by said third feed horn, which carries said selected one of said first set of said communications data and said second set of said communications data, to said earth-based, utility gateway.

8. A method of mitigating microwave signal propagation loss by providing a utility gateway that serves as a backup gateway for multiple operational gateways in a satellite communications system comprising:

transmitting a first microwave signal from said satellite to a first operational earth-based gateway that comprises one of said multiple operational gateways first microwave antenna radiator, said first microwave signal carrying communications data from an earth-based user terminal; detecting propagation loss of a second microwave signal received by said satellite from said first earth-based gateway using said first microwave antenna;

providing a first switch that communicatively couples said first microwave signal to a second microwave antenna;

switching said first microwave signal, using said first switch to said second microwave antenna in response to detection of said propagation loss of said second microwave signal;

transmitting said first microwave signal from said satellite to said utility gateway, using said second microwave antenna, said first microwave signal carrying said communication data from said earth-based user terminal to said utility gateway, that serves as a backup gateway upon detection of said propagation loss;

providing a second switch that communicatively couples said second microwave signal to said second microwave antenna.

9. The method of claim 8 wherein said propagation loss in said first microwave signal is due to weather.

10. The method of claim 8 wherein said propagation loss of said microwave signal is due to one of electrical failure, fire, flood, and tornado.

* * * * *